United States Patent
Karstadt et al.

(10) Patent No.: US 11,105,218 B2
(45) Date of Patent: Aug. 31, 2021

(54) COMPRESSOR WITH VARIABLE COMPRESSOR INLET

(71) Applicant: BorgWarner Inc., Auburn Hills, MI (US)

(72) Inventors: Sascha Karstadt, Undenheim (DE); Waldemar Henke, Griesheim (DE); Juergen Werner, Mainz (DE); Stefan Muenz, Ludwigshafen (DE); Sascha Weiske, Weilerbach (DE); Gerd Spinner, Alzey (DE); Uwe Tomm, Goellheim (DE); Patric Hoecker, Landau (DE)

(73) Assignee: BorgWarner Inc., Auburn Hills, MI (US)

( * ) Notice: Subject to any disclaimer, the term of this patent is extended or adjusted under 35 U.S.C. 154(b) by 45 days.

(21) Appl. No.: 16/467,806

(22) PCT Filed: Dec. 5, 2017

(86) PCT No.: PCT/US2017/064580
§ 371 (c)(1),
(2) Date: Jun. 7, 2019

(87) PCT Pub. No.: WO2018/106620
PCT Pub. Date: Jun. 14, 2018

(65) Prior Publication Data
US 2020/0011196 A1    Jan. 9, 2020

(30) Foreign Application Priority Data

Dec. 9, 2016  (DE) .......................... 102016123989.5
May 31, 2017  (DE) .......................... 102017209223.8

(51) Int. Cl.
*F01D 17/14*  (2006.01)
*F02B 37/22*  (2006.01)
(Continued)

(52) U.S. Cl.
CPC .......... *F01D 17/146* (2013.01); *F02B 37/225* (2013.01); *F05D 2220/40* (2013.01); *F05D 2250/51* (2013.01)

(58) Field of Classification Search
CPC .. F01D 17/146; F02B 37/225; F05D 2220/40; F05D 2250/51; F05D 2240/12;
(Continued)

(56) References Cited

U.S. PATENT DOCUMENTS

| 4,122,668 A | 10/1978 | Chou et al. |
| 2006/0112690 A1* | 6/2006 | Hemer ...................... F02C 6/12 60/602 |

(Continued)

FOREIGN PATENT DOCUMENTS

| CN | 101171409 A | 4/2008 |
| CN | 104234823 A | 12/2014 |

(Continued)

OTHER PUBLICATIONS

Written Opinion and International Search Report dated Mar. 2, 2018, in International Application No. PCT/US2017/064580.

(Continued)

*Primary Examiner* — J. Todd Newton
*Assistant Examiner* — Eric J Zamora Alvarez
(74) *Attorney, Agent, or Firm* — Eric L. Doyle; Stephan A. Pendorf; Patent Central LLC

(57) ABSTRACT

A compressor with a compressor housing in which a compressor wheel is arranged. The compressor additionally includes a cartridge which is arranged in the compressor housing in the area of a compressor inlet. The cartridge is designed to variably change the cross section of the compressor inlet.

12 Claims, 15 Drawing Sheets

(51) Int. Cl.
*F16K 3/03* (2006.01)
*F04D 29/46* (2006.01)

(58) Field of Classification Search
CPC ............ F05D 2260/74; F05D 2260/76; F05D 2270/101; F04D 27/026; F04D 27/002; F04D 29/284; F04D 29/287; F04D 29/46; F04D 29/464; F02C 7/042
See application file for complete search history.

(56) References Cited

U.S. PATENT DOCUMENTS

| | | |
|---|---|---|
| 2006/0261303 A1 | 11/2006 | Thomas et al. |
| 2008/0127644 A1 | 6/2008 | Codan et al. |
| 2014/0308110 A1 | 10/2014 | Houst et al. |
| 2014/0363278 A1 | 12/2014 | Piper et al. |
| 2015/0292350 A1* | 10/2015 | Metz ........................ F02B 37/24 415/148 |
| 2016/0010542 A1 | 1/2016 | Metz |
| 2016/0146099 A1 | 5/2016 | Mohtar et al. |
| 2016/0177956 A1 | 6/2016 | Mohtar et al. |
| 2016/0281735 A1 | 9/2016 | Jiang et al. |
| 2017/0292616 A1* | 10/2017 | Moens ........................ F16K 3/03 |

FOREIGN PATENT DOCUMENTS

| | | |
|---|---|---|
| CN | 105626583 A | 6/2016 |
| CN | 105715360 A | 6/2016 |
| DE | 102012011423 B3 | 11/2013 |
| EP | 3236077 A1 | 10/2017 |
| WO | 2016041024 A2 | 3/2016 |

OTHER PUBLICATIONS

European Office Action dated Oct. 22, 2020, in corresponding European Application No. 17 826 001.4.
Chinese Office Action (with English language translation) dated Jun. 1, 2020, in Chinese Application No. 201780018666.1.
Chinese Office Action (with English language translation) dated Feb. 2, 2021, in Chinese Application No. 201780018666.1.

* cited by examiner

COMPRESSOR WITH VARIABLE COMPRESSOR INLET

FIELD OF THE INVENTION

The present invention relates to a compressor with variable compressor inlet and a charging device with a corresponding compressor.

BACKGROUND INFORMATION

Increasingly more vehicles of the more recent generation are equipped with charging devices. In order to achieve the target demands and the legal requirements, it is imperative to promote development in the complete drive train and also to optimize the individual components as well as the system as a whole with respect to their reliability and efficiency.

Exhaust gas turbochargers are known, for example, in which a turbine with a turbine wheel is driven by the exhaust gas flow of the internal combustion engine. A compressor with a compressor wheel, which is arranged with a turbine wheel on a mutual shaft, compresses the fresh air taken in for the engine. By this means, the air or oxygen amount, available to the engine for combustion, is increased, which in turn leads to an increased output of the internal combustion engine.

Compressors may also be used to support exhaust gas turbochargers, or decoupled from exhaust gas turbochargers, for example, in mechanically or electrically driven compressors, or, for example, in combination with an air supply for a fuel cell engine.

Known compressors comprise a compressor housing in which a compressor wheel is arranged. The fresh air is sucked in by a compressor inlet, accelerated by the compressor wheel, and exits the compressor via a volute. Each compressor has a compressor-specific compressor characteristic map, wherein the operation of the compressor is limited to the range of the compressor characteristic map between the surge limit and the choke line. Depending on the size and configuration of the compressor, operation at low volume flows by the compressor may be inefficient or no longer possible, as the surge limit is not achieved.

The object of the present invention is accordingly to provide more efficient compressors with a larger usable compressor characteristic map.

BRIEF SUMMARY OF THE INVENTION

The present invention relates to a compressor for a charging device and also a charging device including such a compressor.

The compressor according to the invention comprises a compressor housing in which a compressor wheel is arranged, and an adjusting mechanism which is arranged in the compressor housing in the area of a compressor inlet for variably changing the cross section of the compressor inlet. The adjusting mechanism comprises a plurality of diaphragm elements, which are rotatably mounted in the compressor housing, and an adjusting ring. Thus, because the cross section of the compressor inlet is variably changeable, said inlet may be adapted corresponding to the respective operating range of the compressor. Thus, a larger compressor characteristic map as a whole may be used with one single compressor, since the surge limit of the compressor may be displaced further to the left, thus in the direction of a lower volume flow in the compressor characteristic map. By this means, it is achieved that a reduction of the cross section of the compressor inlet leads to an acceleration of the flow. In addition, a homogeneous inflow may be generated since a detachment of the flow in the area of the hub of the compressor wheel may be reduced or avoided due to the narrowing of the cross section. Overall, the adjusting mechanism, which enables a variable configuration of the cross section of the compressor inlet, leads to an increased efficiency of the compressor, which in turn has a positive effect on fuel consumption and/or the torque build-up for a downstream internal combustion engine.

In configurations, the adjusting mechanism may variably change the size of the cross section of the compressor inlet.

In configurations, which are combinable with all previously described configurations, a maximum cross section of the compressor inlet may be provided in a first position of the adjusting mechanism, and a minimum cross section of the compressor inlet may be provided in a second position of the adjusting mechanism. The adjusting mechanism may be bringable into at least one intermediate position, in which the cross section of the compressor inlet lies between the maximum cross section and the minimum cross section.

In configurations, which are combinable with all previously described configurations, the diaphragm elements may be mechanically coupled to the adjusting ring so that a movement, in particular a rotation of the adjusting ring causes a displacement of the diaphragm elements. The diaphragm elements may be displaceable between a first position, which corresponds to the first position of the adjusting mechanism, and a second position, which corresponds to the second position of the adjusting mechanism. The diaphragm elements may be configured in such a way that together they form a circular cross-sectional boundary for the compressor inlet in the second position. Radially inwardly disposed lateral walls of the diaphragm elements, which define the cross section for the compressor inlet in the second position, may have a flow-optimized geometry. The diaphragm elements may have corresponding engagement geometries on lateral surfaces contacting one another in the second position, which overlap or mesh into one another in the second position of the diaphragm elements. A seal may be provided at least on one part of a lateral surface of the diaphragm elements, which engages with an opposing lateral surface of a contacting diaphragm element in the second position. In particular, the seal may comprise a glued on seal profile.

In embodiments, which may be combined with all previously mentioned embodiments, the adjusting ring may be rotatably mounted in the compressor housing.

In configurations, which are combinable with all previously described configurations, the adjusting ring may be rotatably mounted in a compressor cover. In particular, an axial projection of the compressor cover may be arranged within the adjusting ring. Alternatively, the adjusting ring may be mounted on the diaphragm elements. This has the advantage that no friction occurs between the adjusting ring and the compressor housing.

In configurations, which are combinable with all previously described configurations, the adjusting ring may be axially positioned by a compressor cover.

In configurations, which are combinable with all previously described configurations, the diaphragm elements may be rotatably mounted in the compressor housing or the compressor cover via shafts. A lever arm, which is in operative connection with the adjusting ring, may be provided per diaphragm element, wherein the lever arm may transfer a movement of the adjusting ring to the corresponding diaphragm element. Integral, one-piece components may be provided which each comprise one of the diaphragm elements and one of the lever arms. The integral, one-piece components may each comprise one of the shafts. The lever arms may be in operative connection with the adjusting ring at their radially outer ends.

In configurations, which are combinable with all previously described configurations, the diaphragm elements may be arranged between the adjusting ring and the compressor housing in the axial direction. Alternatively, the adjusting ring may be arranged radially outside of the diaphragm elements. In particular, the adjusting ring may be arranged in approximately the same radial plane as the diaphragm elements.

In configurations, which are combinable with all previously described configurations, an adjusting actuator may additionally be provided which is in operative connection with the adjusting mechanism. The adjusting actuator may be in operative connection with the adjusting ring and may be designed to rotate the adjusting ring relative to the compressor housing in order to change the cross section of the compressor inlet. The adjusting actuator may be in operative connection with one of the diaphragm elements and/or with a shaft of one of the diaphragm elements, and be designed to thereby rotate the adjusting ring relative to the compressor housing, by which means the remaining diaphragm elements may be actuated in order to change the cross section of the compressor inlet. A controller of the adjusting actuator may be designed to actuate the adjusting actuator and thus the adjusting mechanism, by which means the cross section of the compressor inlet is changed, at least partially based on one or more control variables selected from a speed of a downstream engine, a torque of a downstream engine, a speed of the compressor, a volume flow through the compressor, a pressure ratio in the compressor, the position of a wastegate for an exhaust gas turbine, the position of variable turbine geometry of an exhaust gas turbine, and/or a mass flow through an exhaust gas return.

In another configuration, the invention comprises a compressor with a compressor housing in which a compressor wheel is arranged. The compressor additionally comprises a cartridge which is arranged in the compressor housing in the area of a compressor inlet. The cartridge is designed to variably change the cross section of the compressor inlet. Thus, because the cross section of the compressor inlet is variably changeable, this may be adapted corresponding to the respective operating range of the compressor. Thus, a larger compressor characteristic map as a whole may be used with one single compressor, since the surge limit of the compressor may be displaced further to the left, thus in the direction of a lower volume flow in the compressor characteristic map. By this means, it is achieved that a reduction of the cross section of the compressor inlet leads to an acceleration of the flow. In addition, a homogeneous inflow may be generated since a detachment of the flow in the area of the hub of the compressor wheel may be reduced or avoided due to the narrowing of the cross section. Overall, the cartridge, which enables a variable configuration of the cross section of the compressor inlet, leads to an increased efficiency of the compressor, which in turn has a positive effect on fuel consumption and/or the torque build-up for a downstream internal combustion engine.

In configurations, the cartridge may variably change the size of the cross section of the compressor inlet. A maximum cross section of the compressor inlet may be provided in a first cartridge position and a minimum cross section of the compressor inlet may be provided in a second cartridge position. The cartridge may be bringable into at least one intermediate position, in which the cross section of the compressor inlet lies between the maximum cross section and the minimum cross section.

In configurations, which are combinable with all previously described configurations, the cartridge may comprise a bearing ring, an adjusting ring, and a plurality of diaphragm elements. Due to the reduction of the cross section of the compressor inlet by the diaphragm elements, return flows, which may occur, for example, along the walls of the compressor inlet areas, may be reduced or prevented, in particular in the left area of the compressor characteristic map (thus at low volume flows). The diaphragm elements may be rotatably mounted in the bearing ring. The diaphragm elements may be mechanically coupled to the adjusting ring so that a movement, in particular a rotation of the adjusting ring causes a displacement of the diaphragm elements. The diaphragm elements may be displaceable between a first position, which corresponds to the first cartridge position, and a second position, which corresponds to the second cartridge position. The diaphragm elements may be configured so that together they form a circular cross-sectional boundary for the compressor inlet in the second position. Radially inwardly disposed lateral walls of the diaphragm elements, which define the cross section for the compressor inlet in the second position, may have a flow-optimized geometry.

In configurations, which are combinable with all previously described configurations, the diaphragm elements may have corresponding engagement geometries on lateral surfaces contacting one another in the second position, which overlap or mesh into one another in the second position of the diaphragm elements. In the closed state, the engagement geometries impart to the cartridge, in particular to the diaphragm areas of the cartridge, a higher stability and ensure a better sealing between adjacent diaphragm elements.

In configurations, which are combinable with all previously described configurations, a seal may be provided at least on one part of a lateral surface of the diaphragm elements, which engages with an opposing lateral surface of a contacting diaphragm element in the second position. In particular, the seal may comprise a glued-on seal profile.

In configurations, which are combinable with all previously described configurations, the adjusting ring may be rotatably arranged with respect to the bearing ring. The cartridge may be axially and radially positioned and fixed in the compressor housing via the bearing ring.

In configurations, which are combinable with all previously described configurations, the cross section of the compressor inlet may be defined by the bearing ring in the first cartridge position.

In configurations, which are combinable with all previously described configurations, the diaphragm elements may be rotatably mounted in the bearing ring via shafts. One lever arm, which is in operative connection with the adjusting ring, may be provided per diaphragm element. The lever arm may transfer a movement of the adjusting ring to the corresponding diaphragm element.

In configurations, the lever arms and the diaphragm elements may be arranged on the same side of the bearing ring. Due to the arrangement of the lever arms and the diaphragm elements on the same side of the bearing ring, the axial extension of the entire cartridge may be reduced, by which means the installation space required for the cartridge in the compressor housing may be reduced. In addition to savings potential for installation space, a reduction of the weight of the compressor also results, and also, ultimately, savings in the manufacturing costs resulting therefrom. Integral, one-piece components may be provided which each comprise one of the diaphragm elements and one of the lever arms. The integral, one-piece components may each comprise one of the shafts. The entire cartridge thus comprises only three different parts, namely the bearing ring, the adjusting ring, and the integral components, which combine the diaphragm elements, the lever arms, and the shafts. By this means, the assembly of the cartridge is simplified and cost advantages may be generated during production.

Alternatively, the lever arms and the diaphragm elements may be arranged on different sides of the bearing ring. In this configuration, the shafts may extend through the bearing ring. The shafts may be designed as one piece with the lever arms or the diaphragm elements. Alternatively, the shafts, the diaphragm elements, and the lever arms may each be separate components, wherein the diaphragm elements are connected to the lever arms via the shafts. The lever arms may be arranged at least partially in recesses in a radial lateral surface of the bearing ring, so that a maximum axial extension on this side of the cartridge may be determined from the areas of the radial lateral surface of the bearing ring without recesses.

In configurations, which are combinable with all previously described configurations, the lever arms may be in operative connection with the adjusting ring on their radially outer ends.

In configurations, which are combinable with all previously described configurations, an adjusting actuator may additionally be provided which is in operative connection with the cartridge. The adjusting actuator may be in operative connection with the adjusting ring and may be designed to rotate the adjusting ring relative to the bearing ring in order to change the cross section of the compressor inlet. Additionally, a controller of the adjusting actuator may be provided which is designed to actuate the adjusting actuator and thus the cartridge, by which means the cross section of the compressor inlet is changed, wherein the controller is at least partially controlled based on one or more control variables selected from a speed of a downstream engine, a torque of a downstream engine, a speed of the compressor, a volume flow through the compressor, a pressure ratio in the compressor, the position of a wastegate for an exhaust gas turbine, the position of variable turbine geometry of an exhaust gas turbine, and/or a mass flow through an exhaust gas return.

The invention additionally comprises a charging device with a compressor according to any one of the preceding configurations. The charging device may be an exhaust gas turbocharger and additionally may comprise a turbine. The exhaust gas turbocharger may be an electrically-supported exhaust gas turbocharger and comprise an electric motor. The exhaust gas turbocharger may additionally comprise a bearing housing, wherein the electric motor is arranged in the area of the bearing housing between the turbine and the compressor. Alternatively, the electric motor may be arranged axially upstream of the compressor wheel, wherein the adjusting mechanism is arranged axially between the electric motor and the compressor wheel.

The charging device may also comprise an electric motor and the compressor may be purely electrically driven. The electric motor may also be arranged axially upstream of the compressor wheel in this case, wherein the adjusting mechanism is arranged axially between the electric motor and the compressor wheel.

Additional details and features of the invention are subsequently described by way of the figures.

DETAILED DESCRIPTION OF THE INVENTION

Embodiments of the compressor 10 according to the invention will subsequently be described based on the figures. All details and advantages subsequently described apply both to compressor 10 and also to a charging device with a corresponding compressor. In the scope of this application, radial surfaces/planes refer to surfaces/planes that are arranged essentially perpendicular to axis of rotation 400 of compressor 10.

Figure 1:
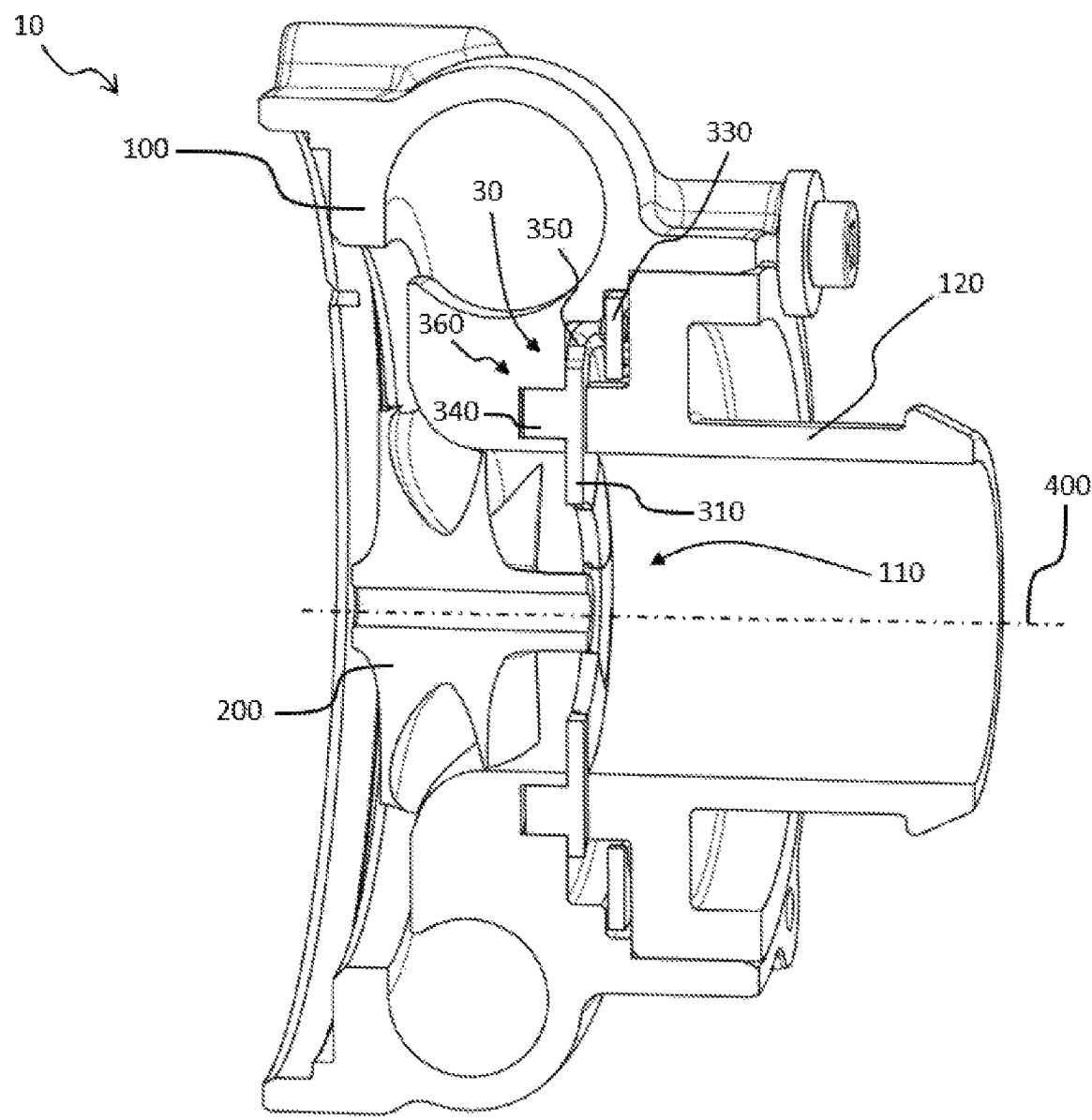
FIG. 1 shows a cutaway view of a first embodiment of a compressor according to the invention.

The figures show different embodiments of compressor 10 according to the invention. Initially, the general components of compressor 10 are described. Subsequently, the particular configuration features of the different embodiments are described in greater detail based on the figures. With reference to FIG. 1, compressor 10 according to the invention comprises a compressor housing 100 in which a compressor wheel 200 is arranged. Compressor 10 additionally comprises an adjusting mechanism 30 which is arranged in compressor housing 100 in the area of a compressor inlet 110 for variably changing the cross section of compressor inlet 110. Adjusting mechanism 30 comprises a plurality of diaphragm elements 310, which are rotatably mounted in compressor housing 100, and an adjusting ring 330. For example, at least three, at least four, at least six, or at least eight diaphragm elements 310 may be provided. Diaphragm elements 310 are arranged upstream of compressor wheel 200 in the flow direction. Thus, because the cross section of compressor inlet 110 is variably changeable, it may be adapted corresponding to the respective operating range of compressor 10. Thus, a larger compressor characteristic map as a whole may be used with one single compressor 10, since the surge limit of compressor 10 may be displaced further to the left, thus in the direction of a lower volume flow in the compressor characteristic map. By this means, it is achieved that a reduction of the cross section of compressor inlet 110 leads to an acceleration of the flow. In addition, a more homogeneous inflow may be generated since a detachment of the flow in the area of the hub of compressor wheel 200 may be reduced or avoided due to the narrowing of the cross section. Overall, adjusting mechanism 30, which enables a variable configuration of the cross section of compressor inlet 110, leads to an increased efficiency of compressor 10, which in turn has a positive effect on fuel consumption and/or the torque build-up for a downstream internal combustion engine.

Figure 2A:
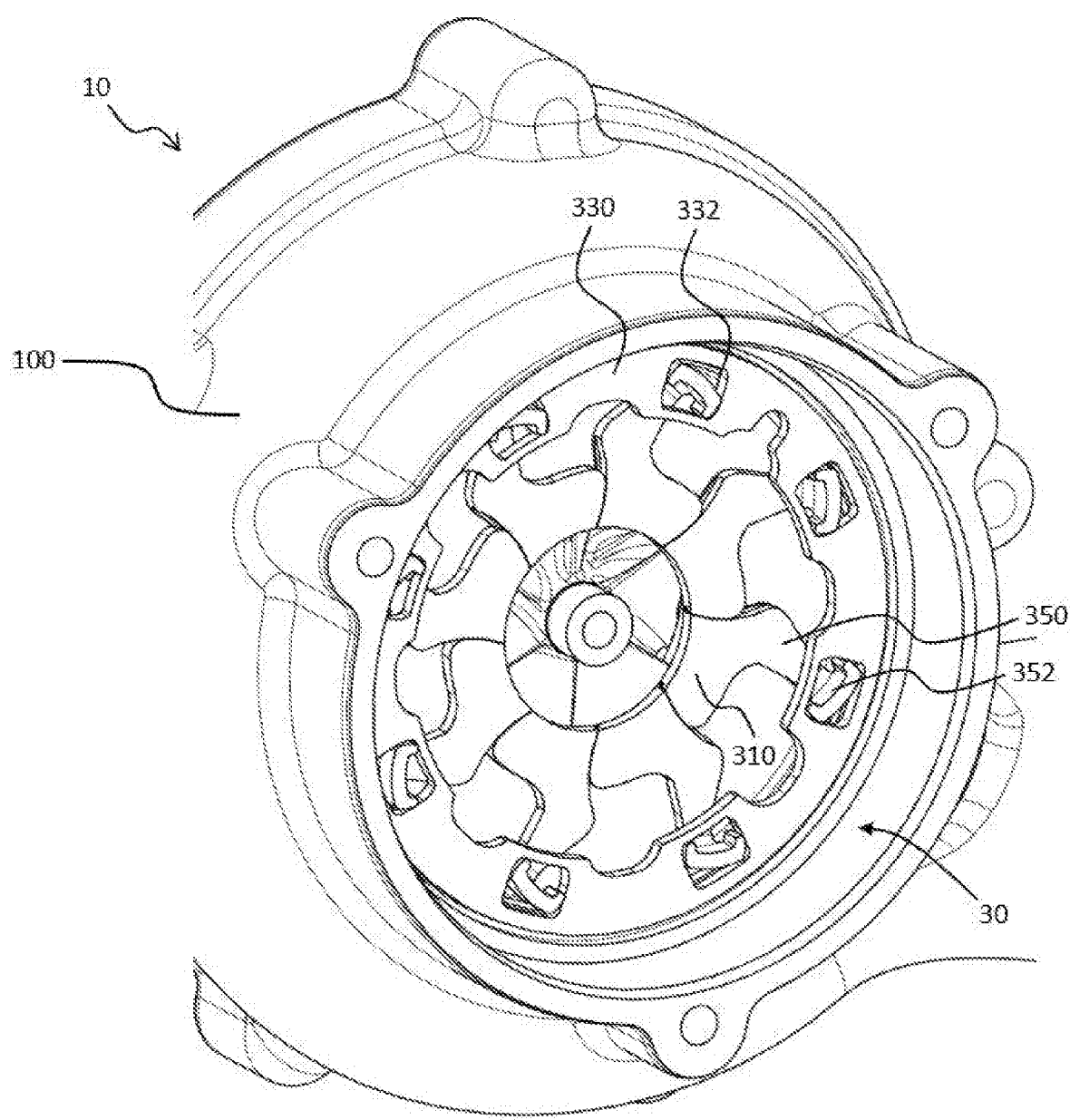
FIG. 2A shows a perspective view of the first embodiment in a closed position of the adjusting mechanism.

As already mentioned, adjusting mechanism 30 may variably change the size of the cross section of compressor inlet 110. A maximum cross section of compressor inlet 110 is provided in a first position of adjusting mechanism 30 (see, e.g. FIG. 2A), and a minimum cross section of compressor inlet 110 is provided in a second position of adjusting mechanism 30 (see, e.g. FIG. 2B). It may additionally be provided that adjusting mechanism 30 may be bringable into at least one intermediate position, in which the cross section of compressor inlet 110 lies between the maximum cross section and the minimum cross section. Alternatively, only two positions of adjusting mechanism 30 may be provided, namely a completely open position with a maximum cross section of compressor inlet 110 and a completely closed position with a minimum cross section of compressor inlet 110.

Figure 4:
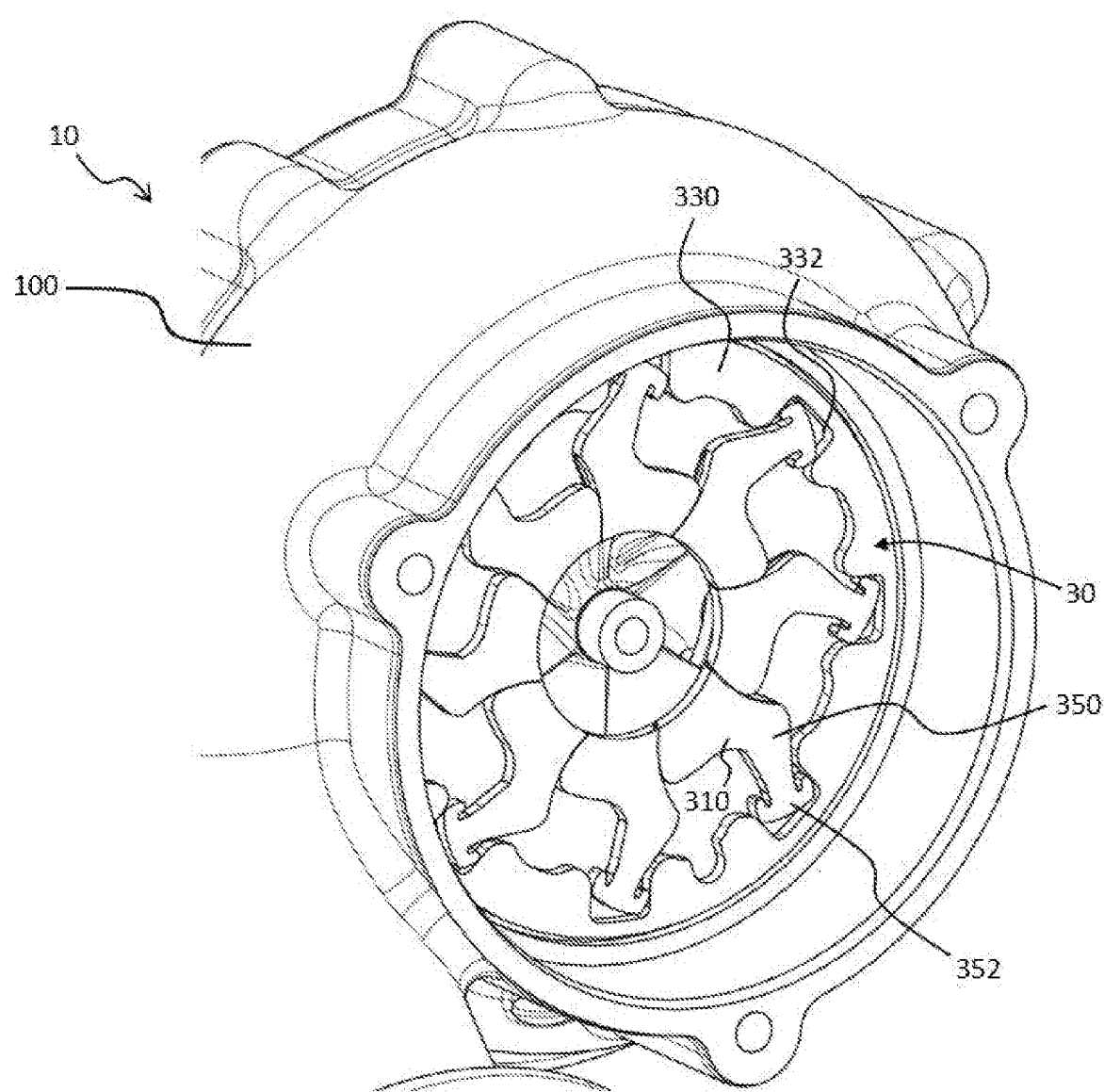
FIG. 4 shows a perspective view of a third embodiment of a compressor according to the invention.

Diaphragm elements 310 of the adjusting mechanism are mechanically coupled to adjusting ring 330 (see, e.g. FIG. 2A, FIG. 2B, or FIG. 4) so that a movement, in particular a rotation of adjusting ring 330 causes a displacement of diaphragm elements 310. The mechanical coupling may be positive locking and/or friction locking. In the embodiments shown, a positive locking connection is used during displacements.

Figure 2B:
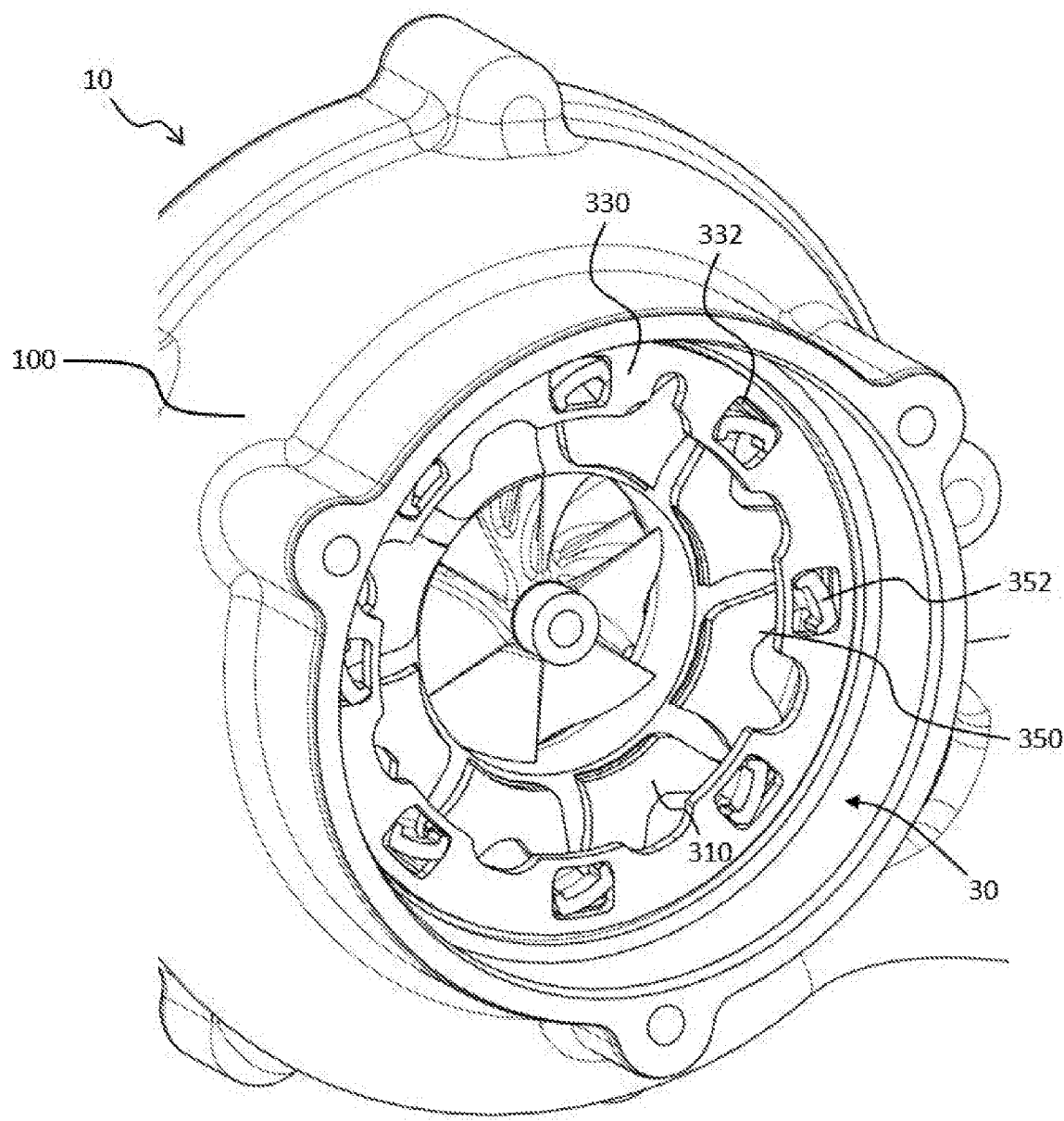
FIG. 2B shows a perspective view of the first embodiment in an open position of the adjusting mechanism.
Figure 13:
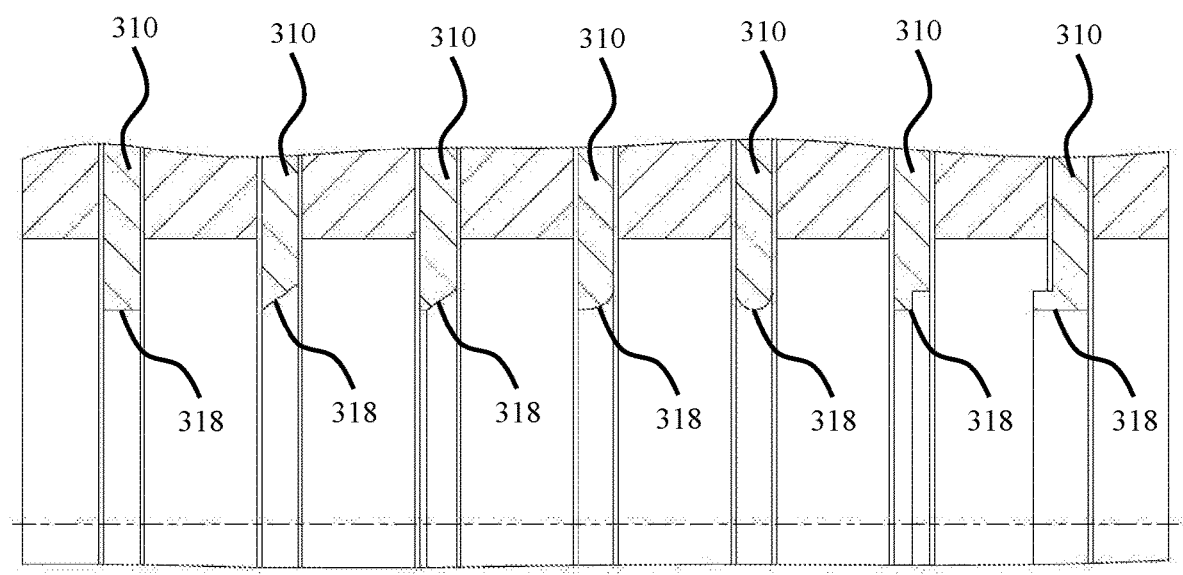
FIG. 13 shows cutaway views of multiple embodiments for the configuration of the radially inward sides of diaphragm elements.

The first position of adjusting mechanism 30 corresponds to a first position of diaphragm elements 310 (see FIG. 2A), and the second position of adjusting mechanism 30 corresponds to a second position of diaphragm elements 310 (see FIG. 2B). As is quite clear in FIG. 2A and FIG. 4, diaphragm elements 310 are configured in such a way that together they form a circular cross-sectional boundary for compressor inlet 110 in the second position. Radially inwardly disposed lateral walls 318 (see, e.g. FIG. 13) of diaphragm elements 310, which define the cross section for compressor inlet 110 in the second position, may have a flow-optimized geometry. According to the application area or depending on the remaining geometry of compressor 10 or depending on a size of compressor 10, the flow optimization of inwardly disposed lateral walls 318 may, for example, be increasingly or decreasingly slanted in the direction of the compressor wheel, rounded off, or have a convex curvature. Multiple potential configurations for radially inwardly disposed lateral walls 318 of diaphragm elements 310 are depicted in FIG. 13.

Figure 6:
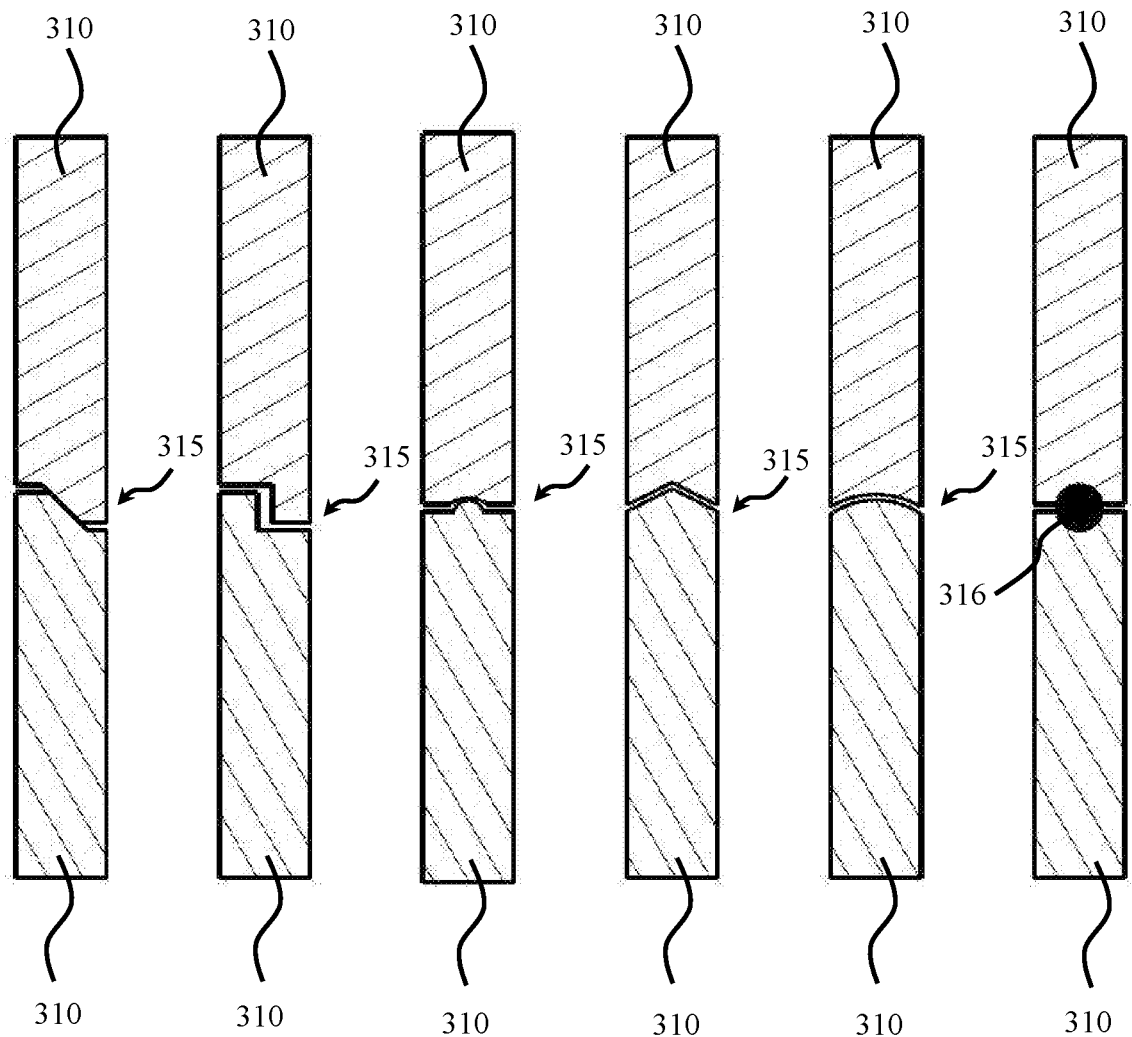
FIG. 6 shows cutaway views of multiple embodiments of diaphragm elements for an adjusting mechanism of a compressor according to the invention.
Figure 10A:
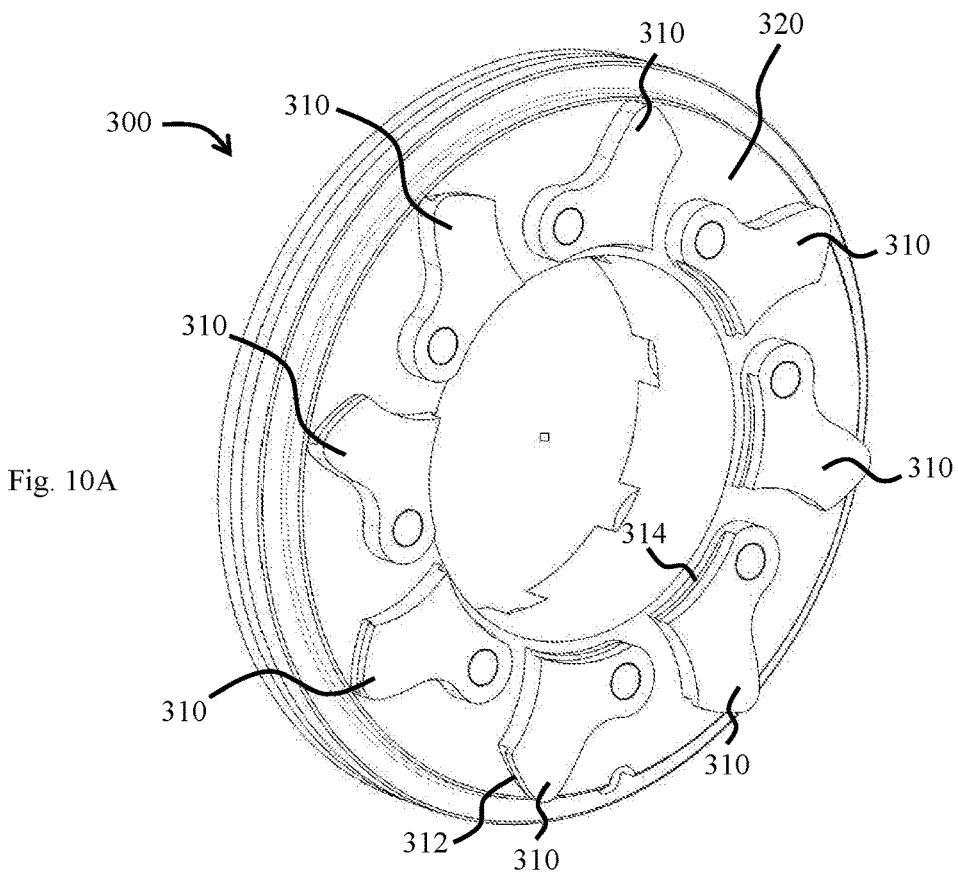
FIG. 10A shows a second view of the first embodiment of the cartridge.
Figure 10B:
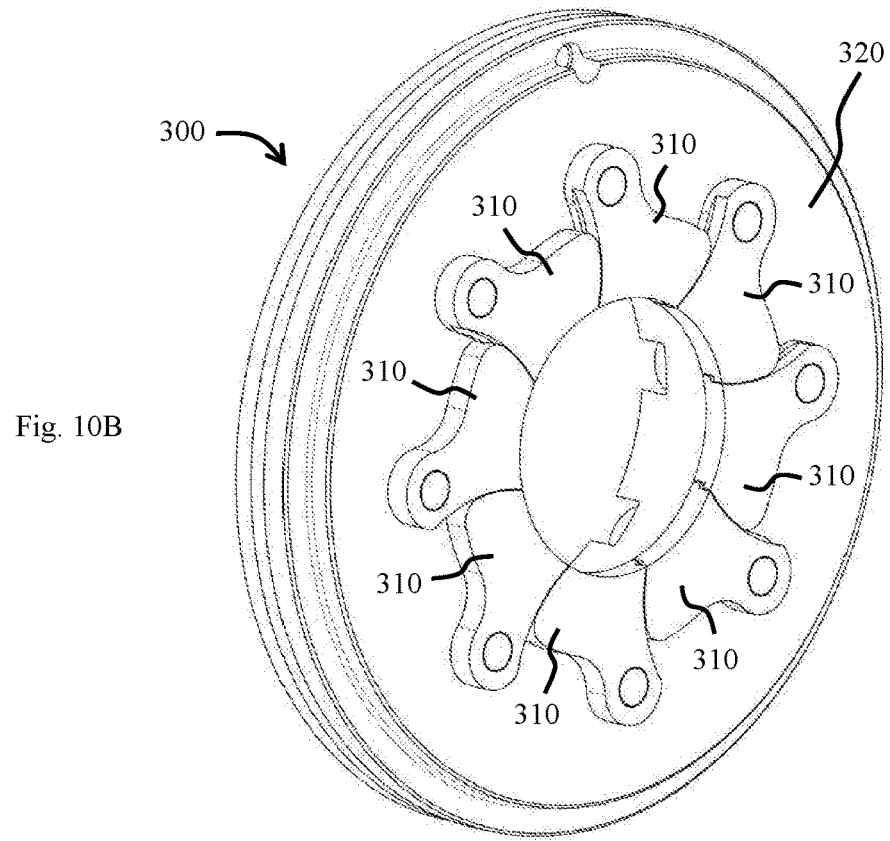
FIG. 10B shows a third view of the first embodiment of the cartridge.

Diaphragm elements 310 may additionally have corresponding engagement geometries 315 on lateral surfaces 312, 314 contacting one another in the second position (see for example FIG. 10A and FIG. 11A), said engagement geometries overlap or mesh into one another in the second position of diaphragm elements 310. Multiple examples for engagement geometries 315 are depicted in FIG. 6. For example, corresponding steps or edges, a recess with a corresponding projection, conical, triangular, or round projections and corresponding recesses may be provided. In the closed state, engagement geometries 315 impart to adjusting mechanism 30 a higher stability and ensure a better sealing between adjacent diaphragm elements 310.

Likewise, an embodiment variant of diaphragm elements 310 is depicted in FIG. 6 which has a seal 316 on at least one part of its lateral surface 312, 314, which interacts in the second position with an opposing lateral surface 312, 314 of a contacting diaphragm element 310. Seal 316 may, for example, comprise a glued-on seal profile. It is also possible to combine seal 316 with the engagement geometries, likewise shown in FIG. 6.

Figure 5:
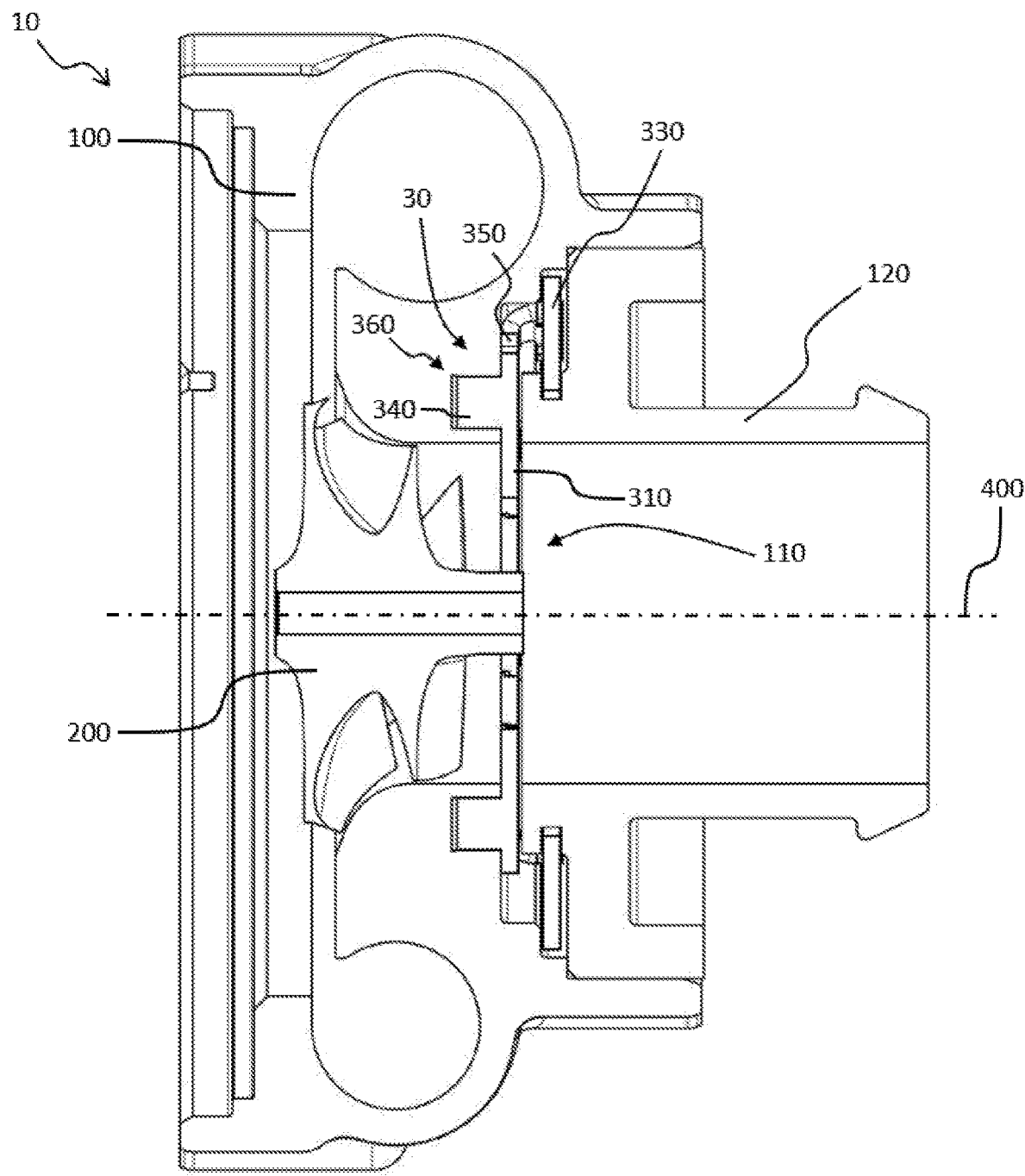
FIG. 5 shows a cutaway view of a fourth embodiment of a compressor according to the invention.

Adjusting ring 330 is rotatably mounted in compressor housing 100. Adjusting ring 330 may, for example, be rotatably mounted in a compressor cover or intake manifold 120. In this case, an axial projection of compressor cover 120 may be arranged radially within adjusting ring 330. This type of embodiment is shown in FIG. 5. Alternatively, adjusting ring 330 may be rotatably mounted directly in compressor housing 100. Such a mounting is possible for the examples in FIGS. 1 through 4. Adjusting ring 330 may also be mounted on its radially outer circumference in compressor housing 100 or in compressor cover 120. Alternatively, adjusting ring 330 may be mounted on its radially inner periphery on a projection of compressor cover 120. Depending on the configuration, either the radially inner periphery of adjusting ring 330 or a radially inner peripheral surface of compressor cover 120 guides the flow in the first position of adjusting mechanism 30. In another alternative, adjusting ring 330 may be mounted directly on diaphragm elements 310 (and not in compressor housing 100 or in compressor cover 120). As is clear in FIGS. 1 through 5, radially outer ends of diaphragm elements 320 have axially extending heads 352 (see e.g. FIGS. 1 through 3 and 5) and/or radially extending heads 352 (see e.g. FIG. 4) which project into corresponding recesses 332 of adjusting ring 330. Bearing ring 330 may be mounted directly on said heads 352. Alternatively, the lever arms may be configured, for example, as bifurcated on their ends, wherein the bifurcations surround corresponding pins that are arranged on the adjusting ring (this alternative is not shown in the figures).

Figure 3:
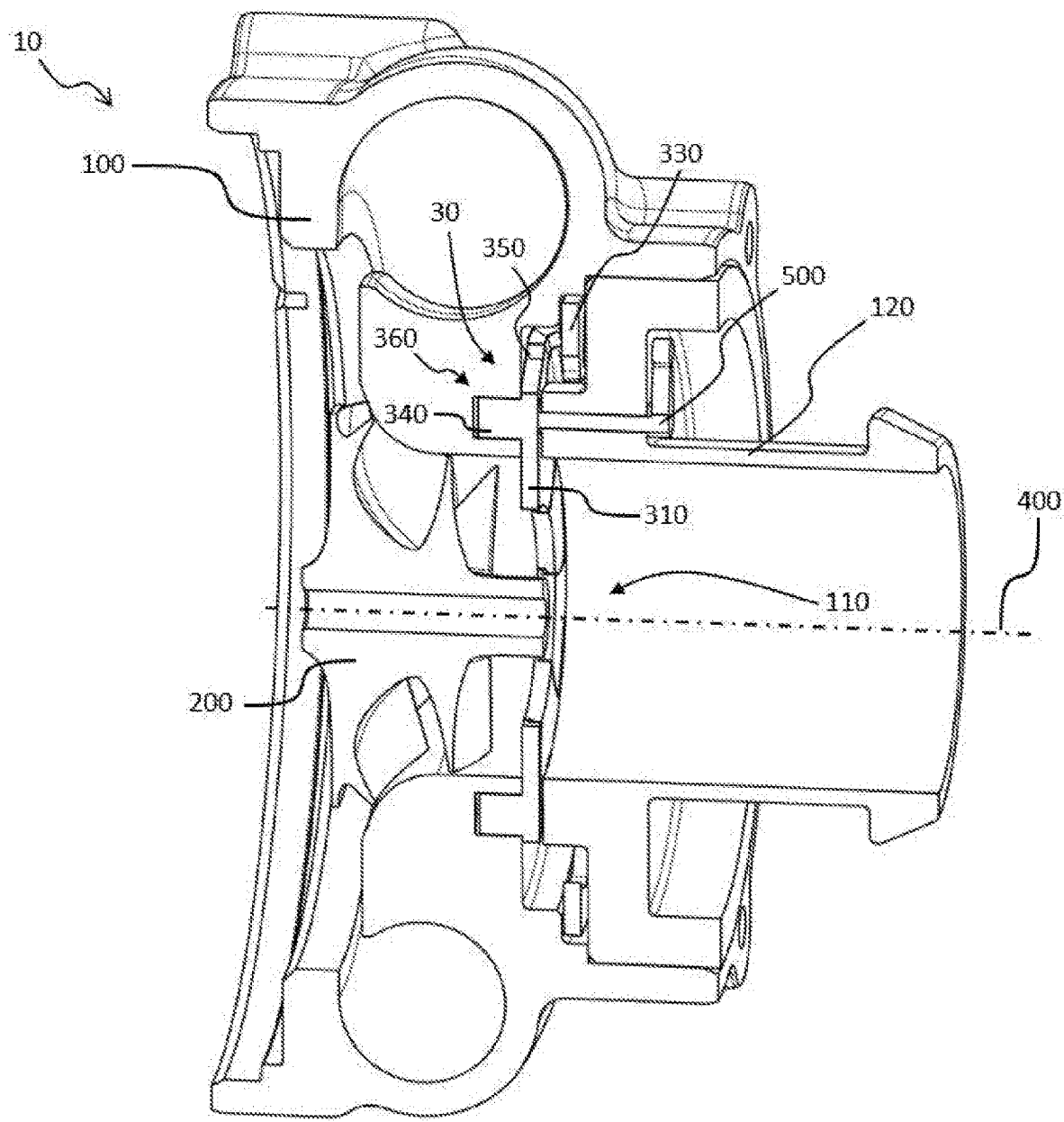
FIG. 3 shows a cutaway view of a second embodiment of a compressor according to the invention.

As is clear from FIGS. 1, 3, and 5, adjusting ring 330 may be axially positioned or guided by compressor cover 120. Depending on the configuration, this may be carried out via compressor cover 120 alone (see FIG. 5) or by compressor cover 120 in combination with compressor housing 100 (see FIG. 1 and FIG. 3). For the second alternative, a projection on the inner wall in compressor housing 100 and/or a retaining ring (not shown) may function together with compressor cover 120 for axial positioning of adjusting ring 330.

With reference to FIGS. 1, 3, and 5, it is clear that diaphragm elements 310 are rotatably mounted in compressor housing 100 via shafts 340. In addition, a lever arm 350, which is in operative connection with adjusting ring 330, is provided per diaphragm element 310 and an operative connection is established via above-mentioned heads 352, wherein lever arm 350 transfers a movement of adjusting ring 330 to corresponding diaphragm element 310. In addition, a transfer of movement in the other direction is also possible. This refers to the case in which adjusting mechanism 30 is actuated in that one of diaphragm elements 310 is displaced. In this case, adjusting ring 300 is rotated via lever arm 350 of said diaphragm element 310, and due to the rotation of adjusting ring 300, the remaining diaphragm elements 310 are actuated and displaced via their lever arms 350. An embodiment for this type of force or movement transfer is shown for example in FIG. 3, in which a rotational movement of a coupling element 500 is forwarded to corresponding diaphragm element 310, which is rotatably mounted in compressor housing 100 via shaft 340.

Figure 14:
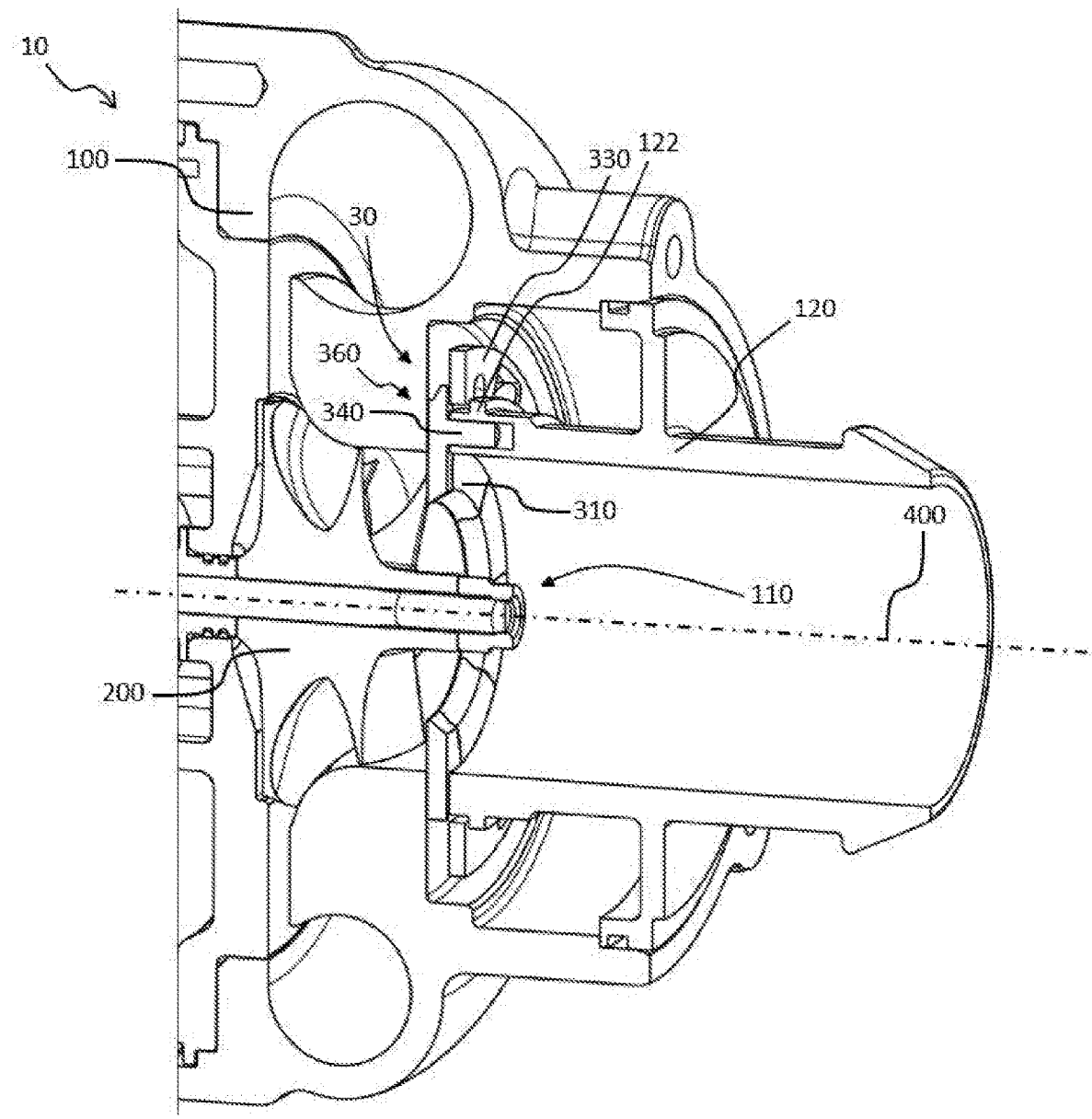
FIG. 14 shows a cutaway view of another embodiment of a compressor according to the invention.

FIG. 14 depicts an alternative mounting of diaphragm element 310 in comparison to the embodiments from FIG. 1 through FIG. 5. In the embodiment in FIG. 14, the diaphragm elements are not rotatably mounted in compressor housing 100, but instead in the compressor cover or intake manifold 120. In this embodiment, the axial guiding of adjusting ring 330 may be carried out via a collar 122 on compressor cover 120 in combination with diaphragm elements 310. Alternatively, the axial guiding may also be carried out via collar 122 and bearing housing 100.

In all previously described embodiments, the axial guiding of the diaphragm elements may be realized via bearing housing 100 in combination with compressor cover 120 (see FIG. 1, FIG. 3, FIG. 5, and FIG. 14).

The diaphragm elements may be integrated into integral, one-piece components 360 which each comprise one of diaphragm elements 310 with corresponding lever arm 350. Integral, one-piece components 360 may additionally each comprise one of shafts 340. Alternatively, separate shafts 340 may be provided which are placed or pressed into, for example, corresponding recesses/holes of diaphragm elements 310, or are otherwise connected (fixedly or rotatably) to diaphragm elements 310. Alternatively, shafts 340 may be preassembled, for example, in compressor housing 100, and diaphragm elements 310 are then placed on preassembled shafts 340 (again by means of corresponding recesses/holes).

There are many possibilities for positioning the diaphragm elements and the adjusting ring relative to one another. In the embodiments shown in FIGS. 1 through 3 and 5, diaphragm elements 310 are arranged in the axial direction between adjusting ring 330 and compressor housing 100. More specifically, diaphragm elements 310 are arranged between adjusting ring 330 and a radial side wall of compressor housing 100. In the alternative embodiment of FIG. 4, adjusting ring 330 is arranged radially outside of diaphragm elements 310. In particular, adjusting ring 330 in this embodiment may be arranged approximately in the same radial plane as diaphragm elements 310. Due to this type of arrangement, additional installation space is saved (in the axial direction).

To actuate adjusting mechanism 30, an adjusting actuator may additionally be provided which is in operative connection to adjusting mechanism 30. The adjusting actuator may, for example, be in operative connection with adjusting ring 330 and may be designed to rotate adjusting ring 330 relative to compressor housing 100 in order to change the cross section of compressor inlet 110. Alternatively, the adjusting actuator may be in operative connection with one of diaphragm elements 310 and/or with a shaft 340 of one of diaphragm elements 310, and may be designed to thereby rotate adjusting ring 330 relative to compressor housing 100, by which means the remaining diaphragm elements 310 may be actuated in order to change the cross section of compressor inlet 110. As already mentioned above, in this type of actuation, one actuator may suffice which transfers a pure rotation to one of shafts 340 to displace one of diaphragm elements 310. This may, for example, transfer a rotational movement via coupling element 500, shown in FIG. 3, to shaft 340 of corresponding diaphragm element 310.

In particular, with reference to FIGS. 7 through 12, additional embodiments of the compressor according to the invention will be subsequently described. In these embodiments, adjusting mechanism 30 is replaced by a cartridge 300. Corresponding elements are still described and depicted in the figures with the same reference numerals.

Figure 7:
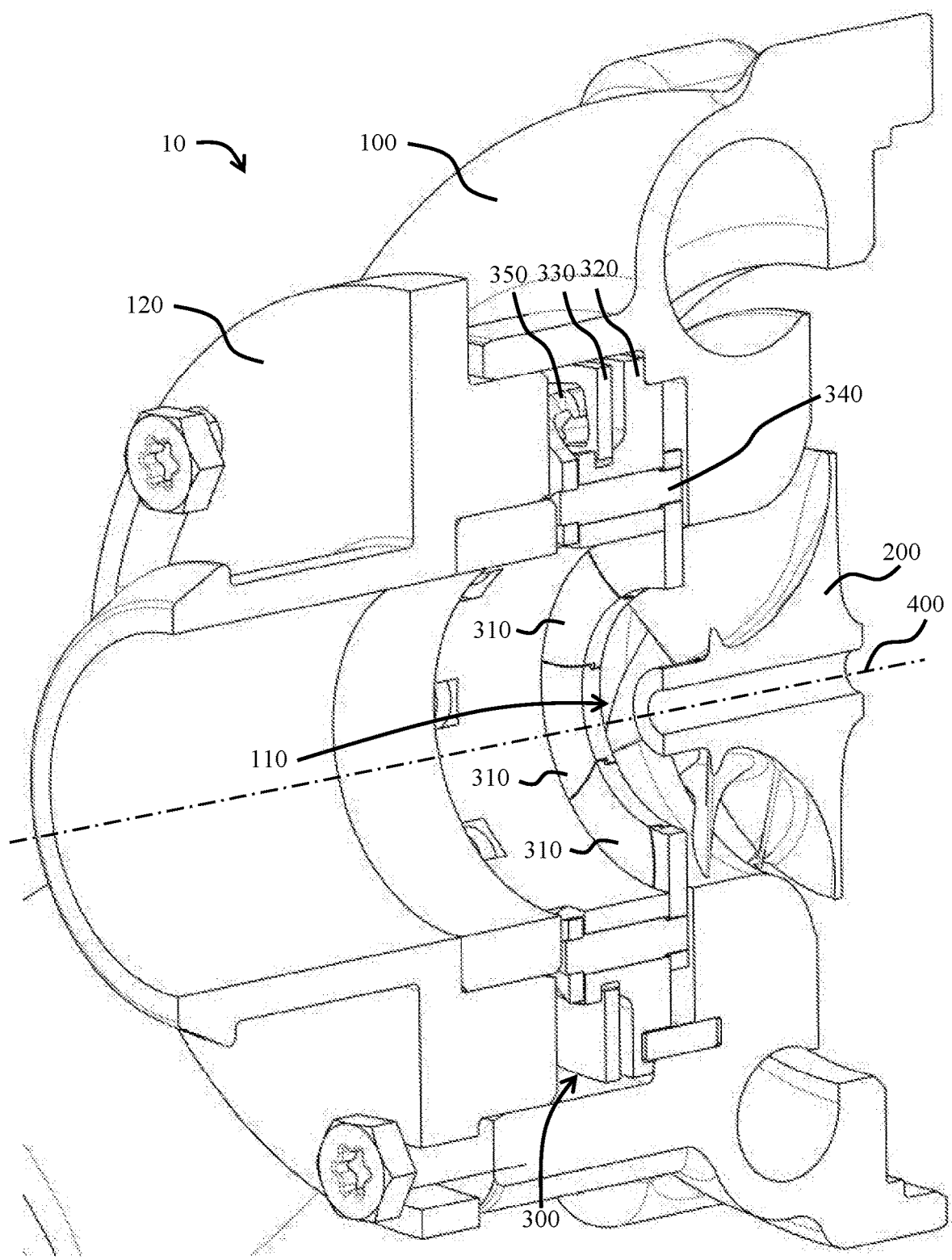
FIG. 7 shows a cutaway view of a fifth embodiment of a compressor according to the invention.

With reference to FIG. 7, a compressor 10 is shown again, which comprises a compressor housing 100 in which compressor wheel 200 is arranged. The compressor additionally comprises a cartridge 300. Cartridge 300 is arranged in compressor housing 100 in the area of compressor inlet 110. This means that cartridge 300 is arranged upstream of compressor wheel 200 when viewed in the flow direction. Cartridge 300 is designed in turn to variably change the cross section of compressor inlet 110. The same advantages result with respect to the possibility of variably changing the cross section of compressor inlet 110 as were described above.

As already previously mentioned, cartridge 300 according to the invention may also variably change the size of the cross section of compressor inlet 110. A maximum cross section of compressor inlet 110 is provided in a first cartridge position (see FIGS. 10A and 11A), and a minimum cross section of compressor inlet 110 is provided in a second cartridge position (as is shown e.g. in FIG. 7).

It may additionally be provided that cartridge 300 may be bringable into at least one intermediate position, in which the cross section of compressor inlet lies between the maximum cross section and the minimum cross section. Alternatively, exclusively two cartridge positions may also be provided, namely a completely open cartridge position with a maximum cross section of compressor inlet 110 and a completely closed cartridge position with a minimum cross section of compressor inlet 110.

Figure 11A:
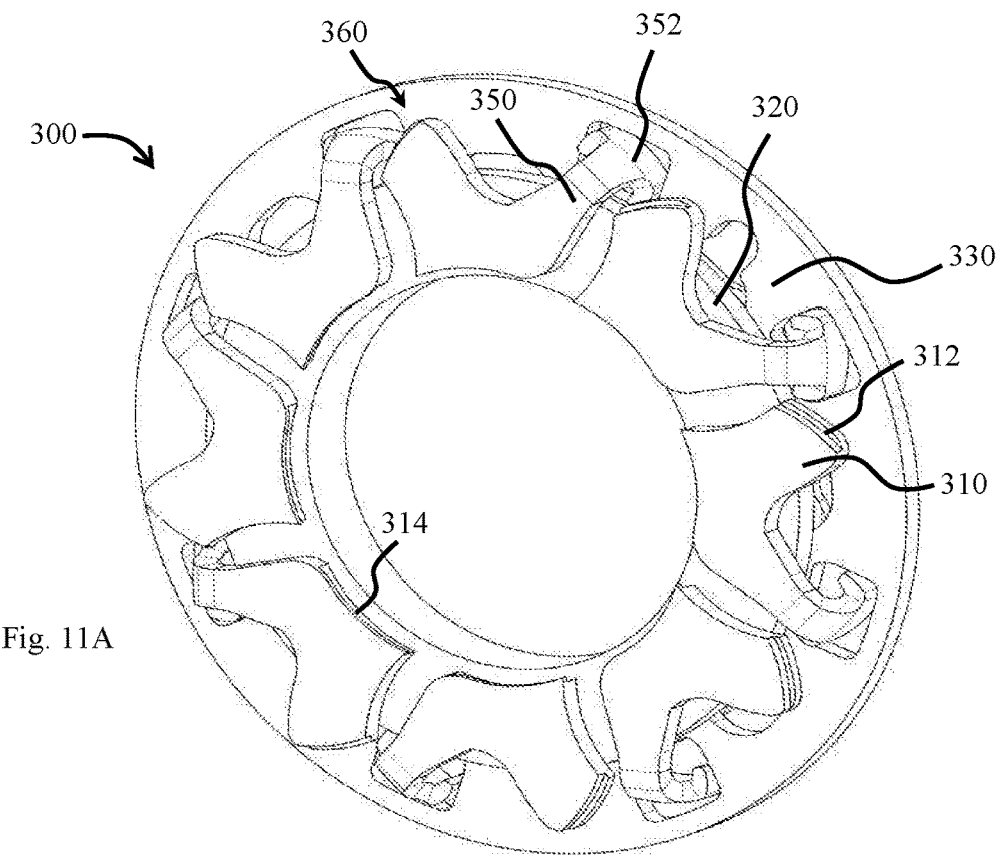
FIG. 11A shows a first view of a second embodiment of a cartridge of a compressor according to the invention.
Figure 11B:
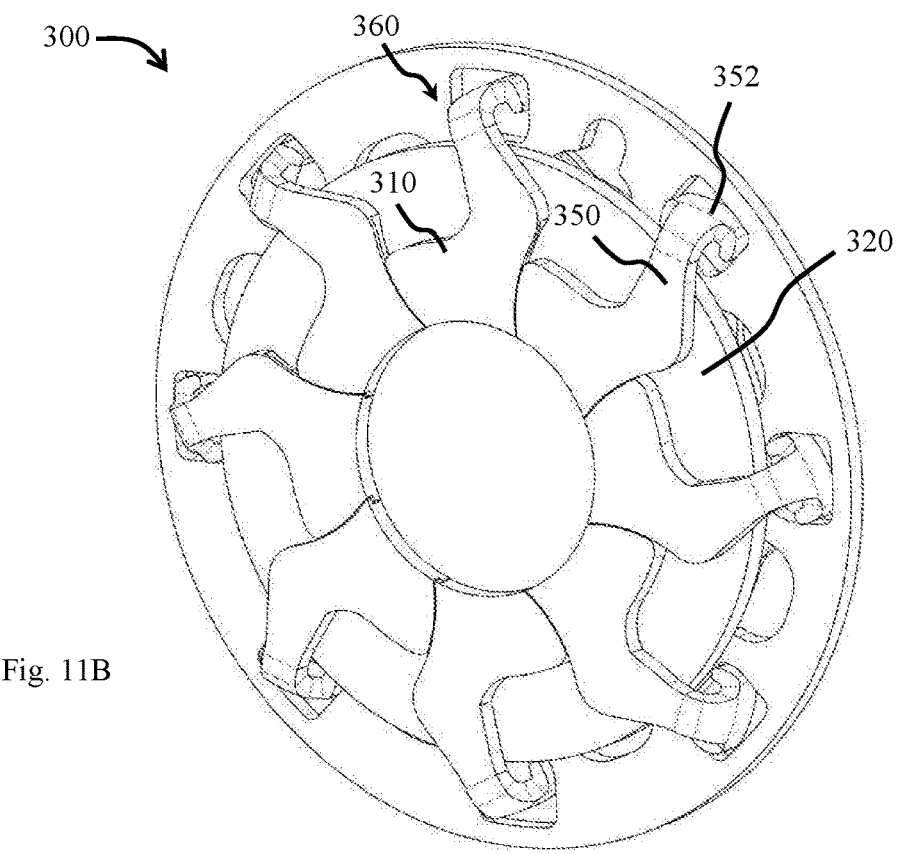
FIG. 11B shows a second view of the second embodiment of a cartridge.
Figure 12:
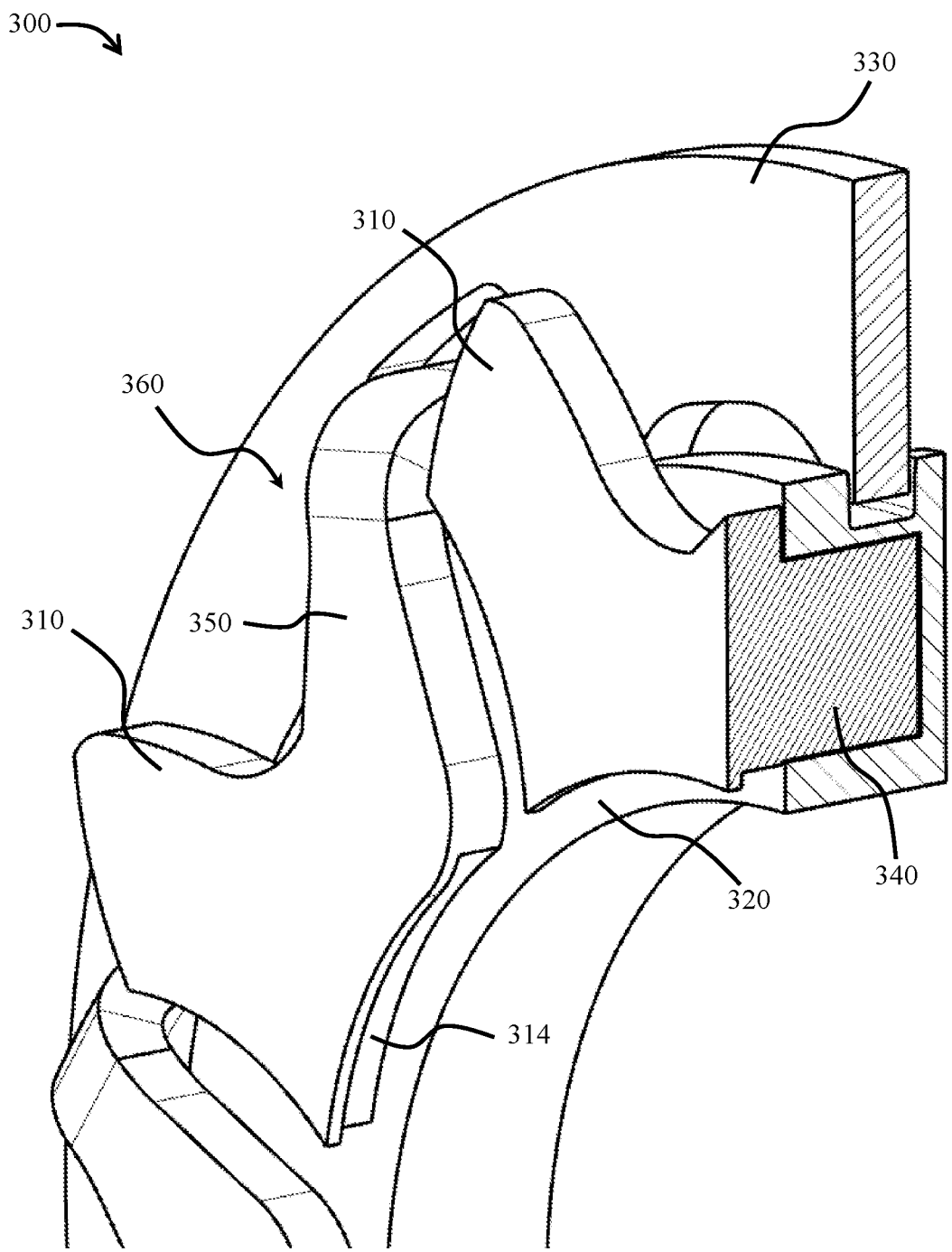
FIG. 12 shows an enlarged partial view of the second embodiment of the cartridge.

FIGS. 8 through 12 show different views of two exemplary embodiments of cartridge 300, wherein FIGS. 8 through 10B depict different views of a first example of cartridge 300 and FIGS. 11A through 12 show different views of a second example of cartridge 300. In both cases, cartridge 300 comprises a bearing ring 320, an adjusting ring 330, and a plurality of diaphragm elements 310. For example, at least three, at least four, at least six, or at least eight diaphragm elements 310 may be provided.

Figure 9:
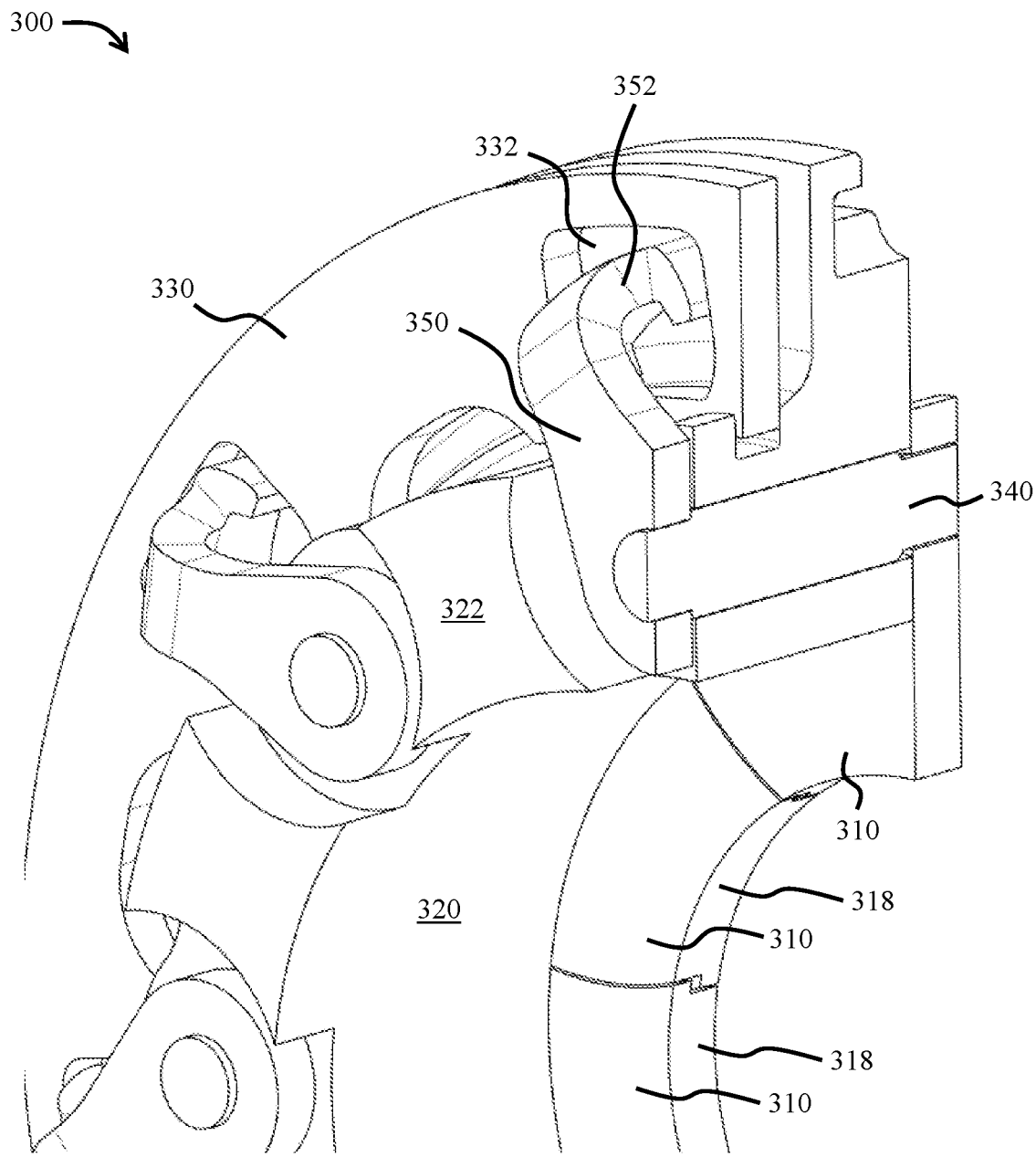
FIG. 9 shows an enlarged partial view of the first embodiment of the cartridge.

Diaphragm elements 310 are rotatably mounted in bearing ring 320 (see, e.g., FIG. 9 and FIG. 12). In addition, diaphragm elements 310 are uniformly distributed across bearing ring 320 in the circumferential direction. It applies to both embodiments of cartridge 300 shown in the figures, that diaphragm elements 310 are mechanically coupled to adjusting ring 330 so that a movement, in particular a rotation of adjusting ring 330, causes a displacement of diaphragm elements 310. By this means, diaphragm elements 310 may be displacement between at least one first position, which corresponds to the first cartridge position or to the first position of adjusting mechanism 30, and a second position, which corresponds to the second cartridge position or to the second position of adjusting mechanism 30. As is shown, e.g., in FIGS. 7, 10B, and 11b, diaphragm elements 310 are configured in such a way that together they form a circular cross-sectional boundary for compressor inlet 110 in the second position. In the first cartridge position, the cross section of compressor inlet 110 is defined by bearing ring 320.

Radially inwardly disposed lateral walls 318 of diaphragm elements 310 (see, e.g., FIG. 9), which define the cross section for compressor inlet 110 in the second position, may in turn have a flow-optimized geometry (see FIG. 13). Diaphragm elements 310 may additionally have corresponding engagement geometries 315 on lateral surfaces 312, 314 contacting one another in the second position, which overlap or mesh into one another in the second position of diaphragm elements 310. In FIGS. 7 through 12, said engagement geometries 315 are configured as step-shaped projections configured as offset to one another. In FIG. 6, additional examples for engagement geometries 315, already mentioned above, are depicted in addition to this possibility.

As likewise previously mentioned, an embodiment variant of diaphragm elements 310 is depicted in FIG. 6 which has a seal 316 on at least one part of its lateral surface 312, 314, which interacts in the second position with an opposing lateral surface 312, 314 of a contacting diaphragm element 310. Seal 316 may be combined with all diaphragm elements 310 and engagement geometries 315 described herein.

Adjusting ring 330 is arranged to be rotatable with respect to bearing ring 320. In addition, cartridge 300 may be axially and radially positioned via bearing ring 320 and fixed in compressor housing 100. Cartridge 300 may be clamped between compressor cover 120 and a radial surface of compressor housing 100, for example, via bearing ring 320 and in combination with compressor cover 120 in the inlet area of compressor 10 (see FIG. 7).

The rotatability of diaphragm elements 310 is facilitated in that diaphragm elements 310 are mounted in bearing ring 320 via shafts 340. A lever arm 350 is in turn provided for each diaphragm element 310, said lever arm being in operative connection with adjusting ring 330. If adjusting ring 330 is actuated, lever arm 350 transfers a movement of adjusting ring 330 to corresponding diaphragm element 310, or vice versa, in this embodiment as well.

In the embodiment of cartridge 300, which is shown in FIGS. 7 through 10B, lever arms 350 and diaphragm elements 310 are arranged on different sides of bearing ring 320. In this configuration, shafts 340 extend through bearing ring 320. Shafts 340 may be separate components or may also be designed as one piece with lever arms 350 or diaphragm elements 310. In all embodiments of this type, diaphragm elements 310 are connected to lever arms 350 via shafts 340. If not configured as one piece, then diaphragm elements 310 or lever arms 350 may be, for example, welded, screwed, or riveted to shafts 340, or connected to shafts 340 via a press fit. As already mentioned, shafts 340 are rotatably mounted in corresponding holes in bearing ring 320 so that a movement of lever arms 340 is transferred to diaphragm elements 310 via shafts 340.

Figure 8:
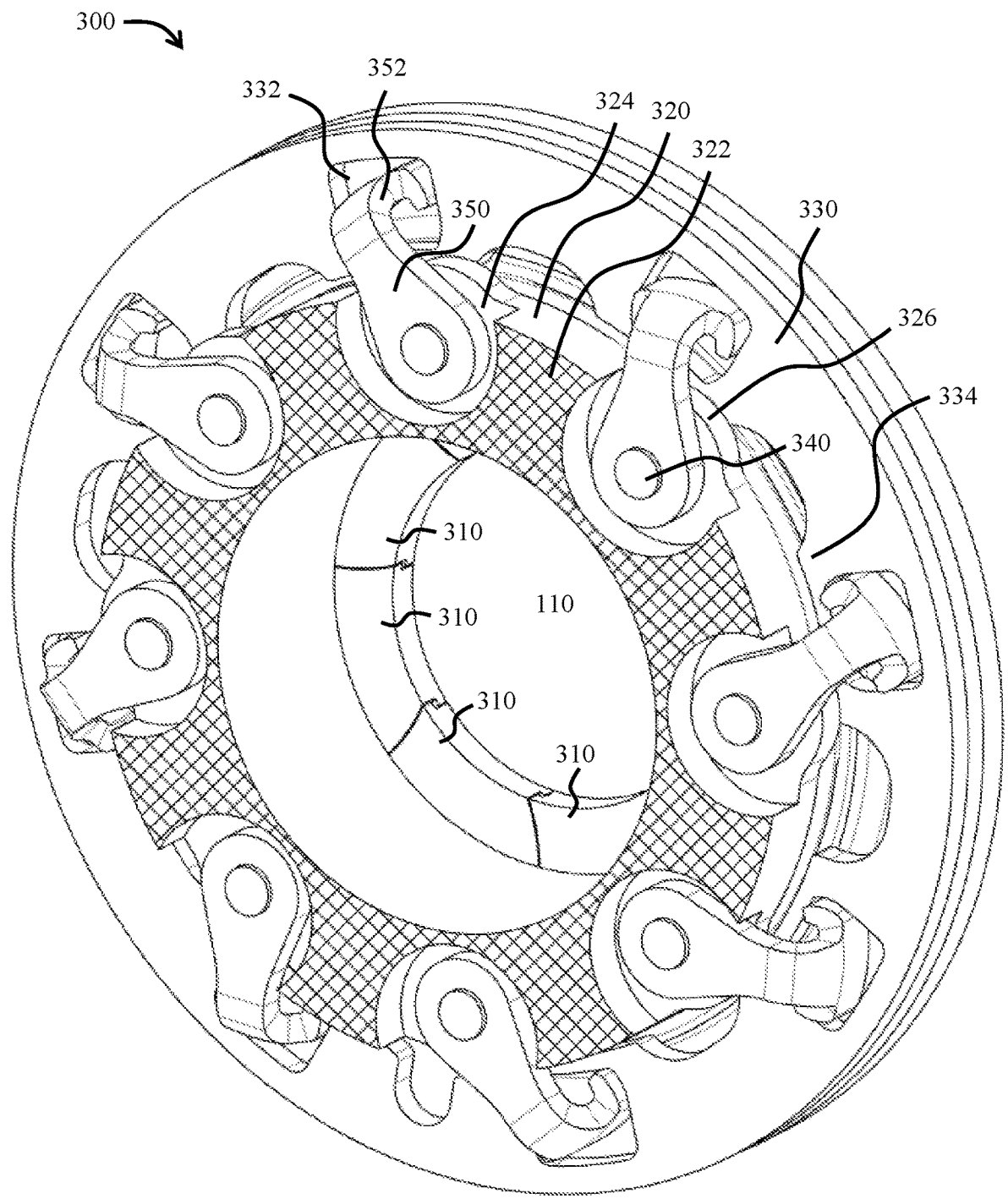
FIG. 8 shows a first view of a first embodiment of a cartridge of a compressor according to the invention.

In the embodiment of cartridge 300 shown in FIG. 8 and FIG. 9, lever arms 350 are arranged at least partially in recesses 324 in a radial lateral surface 322 of bearing ring 320. Due to this recessed arrangement, a maximum axial extension of cartridge 300 on this side is determined from the areas of radial lateral surface 322 of bearing ring 320 without recesses 324. Due to the fact that lever arms 350 and shafts 340 are arranged in recesses 324 in the axial direction (with respect to axis of rotation 400 of compressor 10), and thus do not project over lateral surface 322 of bearing ring 320, the areas of lateral surface 322 without recesses 324 may function as contact areas for the axial positioning and fixing of cartridge 300 in compressor housing 100.

Adjusting ring 330 is supported radially via lever arms 350. By this means, a friction contact of adjusting ring 330 with bearing ring 320 may be prevented. Adjusting ring 330 is held on bearing ring 320 in the axial direction via projections 326 (see FIG. 8). Projections 326 are arranged in an area of bearing ring 320 in which shafts 340 are arranged in the assembled state. In the case that, as shown in FIG. 8 and FIG. 9, recesses 324 are provided, then the projections are arranged in the areas of recesses 324. Adjusting ring 330 has protrusions 334, which are arranged facing radially inward in the areas of recesses 332 and which interact with projections 326 in the assembled state in order to axially position adjusting ring 330. Adjusting ring 330 is thus mounted in the radial direction via lever arms 350 to be pivotable and with low friction, and is mounted axially via projections 326 and protrusions 334 of adjusting ring 330. The loads acting in the axial direction and the resulting friction are relatively low. Friction in the radial direction is reduced to a minimum by the pivotable mounting of adjusting ring 330 on lever arms 350. Lever arms 350 thus have two functions, namely the radial mounting of adjusting ring 330 and the generation of an operative connection between adjusting ring 330 and diaphragm elements 310.

In the embodiment of cartridge 300, which is shown in FIGS. 11A through 12, lever arms 350 and diaphragm elements 310 are arranged on the same side of bearing ring 320. Due to the arrangement of lever arms 350 and diaphragm elements 310 on the same side of bearing ring 320, the axial extension of the entire cartridge 300 may be reduced, by which means the installation space required for cartridge 300 in compressor housing 100 may be reduced. In addition to savings potential for installation space, a reduction of the weight of compressor 10 also results, and also, ultimately, savings in the manufacturing costs resulting therefrom. In this embodiment of cartridge 300, one-piece components 360 are provided, which each comprise one of diaphragm elements 310 and one of lever arms 350. Integral, one-piece components 360 may additionally each comprise one of shafts 340. The complete cartridge 300 thus comprises only three different parts, namely bearing ring 320, adjusting ring 330, and integral components 360, which combine diaphragm elements 310, lever arms 350, and shafts 340. By this means, the manufacturing and assembly of the cartridge is simplified and cost advantages may be generated during production.

In all embodiments of compressor 10 according to the invention shown in the figures with cartridge 300, lever arms 350 are in operative connection with adjusting ring 330 on their radially outer ends. Therefore, the radially outer ends of lever arms 350 have in turn axially extending heads 352 which project into corresponding recesses 332 of adjusting ring 330 (see FIGS. 7 through 9 and 11A through 12). As already mentioned above, the lever arms may be alternatively configured, for example, as bifurcated on their ends, wherein the bifurcations surround corresponding pins that are arranged on the adjusting ring (this alternative is not shown in the figures).

To actuate cartridge 300, an adjusting actuator may additionally be provided which is in operative connection with cartridge 300. The adjusting actuator may be in operative connection, for example, with adjusting ring 330 and may be designed to rotate adjusting ring 330 relative to bearing ring 320 in order to change the cross section of compressor inlet 110.

A controller may be provided for the adjusting actuator, cited multiple times in this application and combinable with all embodiments, said controller is designed to actuate the adjusting actuator and thus adjusting mechanism 30, by which means the cross section of compressor inlet 110 is changed. The controller may be controlled at least partially via certain control variables. These control variables may, for example, be selected from the group comprising a speed of a downstream engine, a torque of a downstream engine, a speed of compressor 10, a volume flow through compressor 10, a pressure ratio in compressor 10, the position of a wastegate for an exhaust gas turbine, the position of variable turbine geometry of an exhaust gas turbine, and/or a mass flow through an exhaust gas return.

Due to the low temperatures in the area of compressor inlet 110, all or individual components of adjusting mechanism 30, including the embodiments with cartridge 300, may be manufactured from plastic and/or materials for lower temperatures.

The invention additionally comprises a charging device with a compressor 10 according to any one of the preceding configurations. The charging device may be an exhaust gas turbocharger and additionally may comprise a turbine. The exhaust gas turbocharger may be an electrically-supported exhaust gas turbocharger and comprise an electric motor. The exhaust gas turbocharger may additionally comprise a bearing housing, wherein the electric motor is arranged in the area of the bearing housing between the turbine and compressor 10. Alternatively, the electric motor may be arranged axially upstream of compressor wheel 200, wherein adjusting mechanism 30 is arranged axially between the electric motor and compressor wheel 200. In other words, the arrangement of the electric motor axially upstream of compressor wheel 200 means that the electric motor is positioned in front of/upstream of compressor wheel 200 in the flow direction.

An alternative charging device may also comprise an electric motor and compressor 10 may be purely electrically driven. The electric motor may also be arranged axially upstream of compressor wheel 200 in this case, wherein adjusting mechanism 30 is arranged axially between the electric motor and compressor wheel 200.

Although the present invention has been described and is defined in the attached claims, it should be understood that the invention may also be alternatively defined according to the following embodiments:

1. A compressor (10) for a charging device comprising
    a compressor housing (100) in which a compressor wheel (200) is arranged, and
    an adjusting mechanism (30) which is arranged in the compressor housing (100) in the area of a compressor inlet (110) for variably changing the cross section of the compressor inlet (110),
    characterized in that the adjusting mechanism (30) comprises a plurality of diaphragm elements (310), which are rotatably mounted in the compressor housing (100), and an adjusting ring (330).
2. The compressor according to Embodiment 1, characterized in that the adjusting mechanism (30) may variably change the size of the cross section of the compressor inlet (110).
3. The compressor according to Embodiment 1 or Embodiment 2, characterized in that a maximum cross section of the compressor inlet (110) is provided in a first position of the adjusting mechanism (30) and a minimum cross section of the compressor inlet (110) is provided in a second position of the adjusting mechanism (30).
4. The compressor according to Embodiment 3, characterized in that the adjusting mechanism (30) is bringable into at least one intermediate position, in which the cross section of the compressor inlet (110) lies between the maximum cross section and the minimum cross section.
5. The compressor according to any one of the preceding embodiments, characterized in that the diaphragm elements (310) are mechanically coupled to the adjusting ring (330) so that a movement, in particular a rotation of the adjusting ring (330) causes a displacement of the diaphragm elements (310).
6. The compressor according to any one of Embodiments 3 to 5, characterized in that the diaphragm elements (310) are adjustable between a first position, which corresponds to the first position of the adjusting mechanism (30), and a second position, which corresponds to the second position of the adjusting mechanism (30).
7. The compressor according to Embodiment 6, characterized in that the diaphragm elements (310) are configured so that together they form a circular cross-sectional boundary for the compressor inlet (110) in the second position.
8. The compressor according to Embodiment 6, or Embodiment 7, characterized in that radially inwardly disposed lateral walls (318) of the diaphragm elements (310), which define the cross section of the compressor inlet (110) in the second position, have a flow-optimized geometry.
9. The compressor according to any one of Embodiments 6 to 8, characterized in that the diaphragm elements (310) have corresponding engagement geometries (315) on lateral surfaces (312, 314) contacting one another in the second position, which overlap or mesh into one another in the second position of the diaphragm elements (310).
10. The compressor according to any one of Embodiments 6 to 9, characterized in that a seal (316) is provided on at least one part of a lateral surface (312, 314) of the diaphragm elements (310), which interacts with an opposing lateral surface (312, 314) of a contacting diaphragm element (310) in the second position, in particular wherein the seal (316) comprises a glued-on seal profile.
11. The compressor according to any one of the preceding embodiments, characterized in that the adjusting ring (330) is rotatably mounted in the compressor housing (100).
12. The compressor according to any one of the preceding embodiments, characterized in that the adjusting ring (330) is rotatably mounted in a compressor cover (120), in particular wherein an axial projection of the compressor cover (120) is arranged radially within the adjusting ring (330).
13. The compressor according to any one of Embodiments 1 to 10, characterized in that the adjusting ring (330) is rotatably mounted on the diaphragm elements (310).
14. The compressor according to any one of the preceding embodiments, characterized in that the adjusting ring (330) is axially positioned by a compressor cover (120).
15. The compressor according to any one of the preceding embodiments, characterized in that the diaphragm elements (310) are rotatably mounted in the compressor housing (100) or in the compressor cover (120) via shafts (340).
16. The compressor according to any one of the preceding embodiments, characterized in that a lever arm (350) is provided per diaphragm element (310) and is in operative connection with the adjusting ring (330), wherein the lever arm (350) transfers a movement of the adjusting ring (330) to the corresponding diaphragm element (310).

17. The compressor according to Embodiment 16, characterized in that integral, one-piece components (360) are provided which each comprise one of the diaphragm elements (310) and one of the lever arms (350).

18. The compressor according to Embodiment 17, characterized in that the integral, one-piece components (360) each comprise one of the shafts (340).

19. The compressor according to any one of Embodiments 16 to 18, characterized in that the lever arms (350) are in operative connection with the adjusting ring (330) on their radially outer ends.

20. The compressor according to any one of the preceding embodiments, characterized in that the diaphragm elements (310) are arranged between the adjusting ring (330) and the compressor housing (100) in the axial direction.

21. The compressor according to any one of Embodiments 1 to 19, characterized in that the adjusting ring (330) is arranged radially outside of the diaphragm elements (310), in particular in approximately the same radial plane as the diaphragm elements (310).

22. The compressor according to any one of the preceding embodiments, characterized in that an adjusting actuator is additionally provided which is in operative connection with the adjusting mechanism (30).

23. The compressor according to Embodiment 22, characterized in that the adjusting actuator is in operative connection with the adjusting ring (330) and is designed to rotate the adjusting ring (330) relative to the compressor housing (100) in order to change the cross section of the compressor inlet (110).

24. The compressor according to Embodiment 22, characterized in that the adjusting actuator is in operative connection with one of the diaphragm elements (310) and/or with a shaft (340) of one of the diaphragm elements (310), and is designed to thereby rotate the adjusting ring (330) relative to the compressor housing (100), by which means the remaining diaphragm elements (310) are actuated in order to change the cross section of the compressor inlet (110).

25. The compressor according to any one of Embodiments 22 to 24, characterized in that a controller of the adjusting actuator is designed to actuate the adjusting actuator and thus the adjusting mechanism (30), by which means the cross section of the compressor inlet (110) is changed, at least partially based on one or more control variables selected from a speed of a downstream engine, a torque of a downstream engine, a speed of the compressor (10), a volume flow through the compressor (10), a pressure ratio in the compressor (10), the position of a wastegate for an exhaust gas turbine, the position of variable turbine geometry of an exhaust gas turbine, and/or a mass flow through an exhaust gas return.

26. A compressor (10) for a charging device comprising a compressor housing (100) in which a compressor wheel (200) is arranged, and
    characterized by a cartridge (300), which is arranged in the compressor housing (100) in the area of a compressor inlet (110), wherein the cartridge (300) is designed to variably change the cross section of the compressor inlet (110).

27. The compressor according to Embodiment 26, characterized in that the cartridge (300) may variably change the size of the cross section of the compressor inlet (110).

28. The compressor according to Embodiment 26 or Embodiment 27, characterized in that a maximum cross section of the compressor inlet (110) is provided in a first cartridge position and a minimum cross section of the compressor inlet (110) is provided in a second cartridge position.

29. The compressor according to Embodiment 28, characterized in that the cartridge (300) is bringable into at least one intermediate position, in which the cross section of the compressor inlet lies between the maximum cross section and the minimum cross section.

30. The compressor according to any one of Embodiments 26 to 29, characterized in that the cartridge (300) comprises a bearing ring (320), an adjusting ring (330), and a plurality of diaphragm elements (310).

31. The compressor according to Embodiment 30, characterized in that the diaphragm elements (310) are rotatably mounted in the bearing ring (320).

32. The compressor according to Embodiment 30 or Embodiment 31, characterized in that the diaphragm elements (310) are mechanically coupled to the adjusting ring (330) so that a movement, in particular a rotation of the adjusting ring (330) causes a displacement of the diaphragm elements (310).

33. The compressor according to any one of Embodiments 30 to 32, characterized in that the diaphragm elements (310) are adjustable between a first position, which corresponds to the first cartridge position, and a second position, which corresponds to the second cartridge position.

34. The compressor according to Embodiment 33, characterized in that the diaphragm elements (310) are configured so that together they form a circular cross-sectional boundary for the compressor inlet (110) in the second position.

35. The compressor according to Embodiment 33, or Embodiment 34, characterized in that radially inwardly disposed lateral walls (318) of the diaphragm elements (310), which define the cross section of the compressor inlet (110) in the second position, have a flow-optimized geometry.

36. The compressor according to any one of Embodiments 30 to 35, characterized in that the diaphragm elements (310) have corresponding engagement geometries (315) on lateral surfaces (312, 314) contacting one another in the second position, which overlap or mesh into one another in the second position of the diaphragm elements (310).

37. The compressor according to any one of Embodiments 30 to 36, characterized in that a seal (316) is provided on at least one part of a lateral surface (312, 314) of the diaphragm elements (310), which interacts with an opposing lateral surface (312, 314) of a contacting diaphragm element (310) in the second position, in particular wherein the seal (316) comprises a glued-on seal profile.

38. The compressor according to any one of Embodiments 30 to 37, characterized in that the adjusting ring (330) is rotatably mounted with respect to the bearing ring (320).

39. The compressor according to any one of Embodiments 30 to 38, characterized in that the cartridge (300) is axially and radially positioned via the bearing ring (320) and is fixed in the compressor housing (100).

40. The compressor according to any one of Embodiments 30 to 39, characterized in that the cross section of the compressor inlet (110) is defined by the bearing ring (320) in the first cartridge position.

41. The compressor according to any one of Embodiments 30 to 40, characterized in that the diaphragm elements (310) are rotatably mounted in the bearing ring (320) via shafts (340).
42. The compressor according to Embodiment 41, characterized in that a lever arm (350) is provided per diaphragm element (310) and is in operative connection with the adjusting ring (330), wherein the lever arm (350) transfers a movement of the adjusting ring (330) to the corresponding diaphragm element (310).
43. The compressor according to Embodiment 42, characterized in that the lever arms (350) and the diaphragm elements (310) are arranged on the same side of the bearing ring (320).
44. The compressor according to Embodiment 43, characterized in that integral, one-piece components (360) are provided which each comprise one of the diaphragm elements (310) and one of the lever arms (350).
45. The compressor according to Embodiment 44, characterized in that the integral, one-piece components (360) each comprise one of the shafts (340).
46. The compressor according to Embodiment 42, characterized in that the lever arms (350) and the diaphragm elements (310) are arranged on different sides of the bearing ring (320).
47. The compressor according to Embodiment 46, characterized in that the shafts (340) extend through the bearing ring (320).
48. The compressor according to Embodiment 46 or Embodiment 47, characterized in that the shafts (340) are formed as one piece with the lever arms (350) or the diaphragm elements (310).
49. The compressor according to Embodiment 46 or Embodiment 47, characterized in that the shafts, (340), the diaphragm elements (310), and the lever arms (350) are each separate components, wherein the diaphragm elements (310) are connected to the lever arms (350) via the shafts (340).
50. The compressor according to any one of Embodiments 46 to 49, characterized in that the lever arms (350) are arranged at least partially in recesses (324) in a radial lateral surface (322) of the bearing ring (320), so that a maximum axial extension of the cartridge (300) on this side may be determined from the areas of the radial lateral surface of the bearing ring (320) without recesses.
51. The compressor according to any one of Embodiments 30 to 50, characterized in that the lever arms (350) are in operative connection with the adjusting ring (330) on their radially outer ends.
52. The compressor according to any one of Embodiments 26 to 51, characterized in that an adjusting actuator is additionally provided which is in operative connection with the cartridge (300).
53. The compressor according to Embodiment 52, characterized in that the adjusting actuator is in operative connection with the adjusting ring (330) and is designed to rotate the adjusting ring (330) relative to the bearing ring (320) in order to change the cross section of the compressor inlet (110).
54. The compressor according to Embodiment 52 or Embodiment 53, characterized in that a controller of the adjusting actuator is designed to actuate the adjusting actuator and thus the cartridge (300), by which means the cross section of the compressor inlet (110) is changed, at least partially based on one or more control variables selected from a speed of a downstream engine, a torque of a downstream engine, a speed of the compressor (10), a volume flow through the compressor (10), a pressure ratio in the compressor (10), the position of a wastegate for an exhaust gas turbine, the position of variable turbine geometry of an exhaust gas turbine, and/or a mass flow through an exhaust gas return.
55. A charging device with a compressor (10) according to any one of the preceding configurations.
56. The charging device according to Embodiment 55, characterized in that the charging device is an exhaust gas turbocharger and additionally comprises a turbine.
57. The charging device according to Embodiment 56, characterized in that the exhaust gas turbocharger is an electrically supported exhaust gas turbocharger and comprises an electric motor.
58. The charging device according to Embodiment 57, characterized in that the exhaust gas turbocharger additionally comprises a bearing housing, wherein the electric motor is arranged in the area of the bearing housing between the turbine and the compressor.
59. The charging device according to Embodiment 57, characterized in that the electric motor is arranged axially upstream of the compressor wheel (200), wherein the adjusting mechanism (30) is arranged axially between the electric motor and the compressor wheel (200).
60. A charging device according to Embodiment 55, characterized in that the charging device comprises an electric motor, and the compressor (10) is driven purely electrically.
61. The charging device according to Embodiment 60, characterized in that the electric motor is arranged axially upstream of the compressor wheel (200), wherein the adjusting mechanism (30) is arranged axially between the electric motor and the compressor wheel (200).

The invention claimed is:

1. A compressor (10) for a charging device comprising a compressor housing (100) in which a compressor wheel (200) is arranged, and
a cartridge (300), which is arranged in the compressor housing (100) in an area of a compressor inlet (110), wherein the cartridge (300) comprises a bearing ring (320), an adjusting ring (330), and a plurality of rotatably mounted diaphragm elements (310), wherein rotation of said rotatably mounted diaphragm elements (310) also moves the rotatably mounted diaphragm elements (310) radially to change a cross section of the compressor inlet (110), and wherein the diaphragm elements (310) are rotatably mounted in the bearing ring (320) via shafts (340), and wherein a lever arm (350) is provided per diaphragm element (310) and is in operative connection with the adjusting ring (330), wherein the lever arm (350) transfers a movement of the adjusting ring (330) to the corresponding diaphragm element (310), and wherein the diaphragm elements (310) are displaceable between a first position and a second position, wherein the diaphragm elements (310) are configured so that together they form a circular cross-sectional boundary for the compressor inlet (110) in the second position.

2. The compressor according to claim 1, wherein the diaphragm elements (310) are mechanically coupled to the adjusting ring (330) so that a rotational movement of the adjusting ring (330) causes a radial displacement of the diaphragm elements (310).

3. The compressor according to claim 2,
wherein the lever arms (350) and the diaphragm elements (310) are arranged on the same side of the bearing ring (320); or wherein the lever arms (350) and the diaphragm elements (310) are arranged on different sides of the bearing ring (320) and the shafts (340) extend through the bearing ring (320).

4. The compressor according to claim 1, wherein radially inwardly disposed lateral walls (318) of the diaphragm elements (310), which define the cross section of the compressor inlet (110) in the second position, have a flow-optimized geometry.

5. The compressor according to claim 1, wherein the diaphragm elements (310) have corresponding engagement geometries (315) on lateral surfaces (312, 314) contacting one another in the second position, which overlap or mesh into one another in the second position of the diaphragm elements (310).

6. A charging device with a compressor (10) according to claim 1.

7. A compressor (10) for a charging device comprising
a compressor housing (100) in which a compressor wheel (200) is arranged, and
an adjusting mechanism (30) which is arranged in the compressor housing (100) in an area of a compressor inlet (110) for variably changing a cross section of the compressor inlet (110),
wherein the adjusting mechanism (30) comprises
a plurality of diaphragm elements (310), which are rotatably mounted in the compressor housing (100), and
an adjusting ring (330),
wherein rotation of said adjusting ring rotates the rotatably mounted diaphragm elements (310) with radial displacement of the rotatably mounted diaphragm elements (310) to change the cross section of the compressor inlet (110), and
wherein a lever arm (350) is provided per diaphragm element (310) and is in operative connection with the adjusting ring (330), wherein the lever arm (350) transfers a movement of the adjusting ring (330) to the corresponding diaphragm element (310), and
wherein the diaphragm elements (310) are displaceable between a first position and a second position, wherein the diaphragm elements (310) are configured so that together they form a circular cross-sectional boundary for the compressor inlet (110) in the second position.

8. The compressor according to claim 7, wherein the diaphragm elements (310) are mechanically coupled to the adjusting ring (330) so that a movement of the adjusting ring (330) causes a radial displacement of the diaphragm elements (310).

9. The compressor according to claim 7, wherein the adjusting ring (330) is rotatably mounted in the compressor housing (100).

10. The compressor according to claim 7,
wherein the diaphragm elements (310) are arranged between the adjusting ring (330) and the compressor housing (100) in the axial direction; or
wherein the adjusting ring (330) is arranged radially outside of the diaphragm elements (310).

11. The compressor according to claim 7, wherein the adjusting ring (330) is rotatably mounted in a compressor cover (120) or on the diaphragm elements (310).

12. The compressor according to claim 7, wherein the diaphragm elements (310) are arranged on a radial plane, and wherein the adjusting ring (330) is arranged radially outside of the diaphragm elements (310) in the same radial plane as the diaphragm elements (310).

* * * * *